US 8,824,946 B2

(12) United States Patent
Yoshizawa et al.

(10) Patent No.: US 8,824,946 B2
(45) Date of Patent: Sep. 2, 2014

(54) URETHANE RESIN LAMINATE, FIXING ROLL, FIXING BELT, IMAGE FIXING DEVICE, TRANSPARENT PLATE FOR PLATEN, DOCUMENT READER, AND IMAGE FORMING APPARATUS

(75) Inventors: Hisae Yoshizawa, Kanagawa (JP); Tomoko Miyahara, Kanagawa (JP); Hiroshi Saegusa, Kanagawa (JP); Kazunori Anazawa, Kanagawa (JP); Kaoru Torikoshi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 325 days.

(21) Appl. No.: 13/405,945

(22) Filed: Feb. 27, 2012

(65) Prior Publication Data

US 2013/0051880 A1 Feb. 28, 2013

(30) Foreign Application Priority Data

Aug. 26, 2011 (JP) ................................. 2011-185242

(51) Int. Cl.
*G03G 15/20* (2006.01)
*B32B 7/02* (2006.01)
*B32B 27/40* (2006.01)
*B32B 17/06* (2006.01)

(52) U.S. Cl.
CPC ................. *G03G 15/2053* (2013.01); *B32B 17/064* (2013.01)
USPC ............................ 399/333; 428/423; 428/412

(58) Field of Classification Search
USPC ........................................................... 399/333
See application file for complete search history.

(56) References Cited

U.S. PATENT DOCUMENTS

| 6,625,416 | B1 * | 9/2003 | Badesha et al. ............... 399/308 |
| 6,953,615 | B2 * | 10/2005 | Schlueter et al. ........... 428/36.91 |
| 8,463,167 | B2 * | 6/2013 | Tanaka et al. ................. 399/327 |
| 2006/0286382 | A1 | 12/2006 | Anzures et al. | |

FOREIGN PATENT DOCUMENTS

| JP | A-2006-119772 | 5/2006 |
| JP | A-2006-138879 | 6/2006 |
| JP | A-2007-23270 | 2/2007 |
| JP | A-2007-273408 | 10/2007 |
| JP | A-2008-9347 | 1/2008 |
| JP | A-2011-31527 | 2/2011 |

* cited by examiner

*Primary Examiner* — David Gray
*Assistant Examiner* — Michael Harrison
(74) *Attorney, Agent, or Firm* — Oliff PLC

(57) ABSTRACT

A urethane resin laminate includes a substrate material having a contact angle of water in the surface of the substrate material being from 0 degree to 90 degrees, an inner urethane resin layer, and an outer urethane resin layer in this order. The inner urethane resin layer contains urethane resin that does not have a fluorine atom in a molecular structure, and has self-repairability. The outer urethane resin layer contains urethane resin containing a fluorine atom in a molecular structure, and has self-repairability.

18 Claims, 7 Drawing Sheets

URETHANE RESIN LAMINATE, FIXING ROLL, FIXING BELT, IMAGE FIXING DEVICE, TRANSPARENT PLATE FOR PLATEN, DOCUMENT READER, AND IMAGE FORMING APPARATUS

CROSS-REFERENCE TO RELATED APPLICATIONS

This application is based on and claims priority under 35 USC 119 from Japanese Patent Application No. 2011-185242 filed Aug. 26, 2011.

BACKGROUND

1. Technical Field

The present invention relates to a urethane resin laminate, a fixing roll, a fixing belt, an image fixing device, a transparent plate for a platen, a document reader, and an image forming apparatus.

2. Related Art

A technique of providing the surface of a substrate material with a material having self-repairability as a protective layer to repair cracks generated on the surface of the protective layer is tried.

SUMMARY

According to an aspect of the invention, there is provided a urethane resin laminate including a substrate material having a contact angle of water in the surface of the substrate material being from 0 degree to 90 degrees, an inner urethane resin layer, and an outer urethane resin layer in this order. The inner urethane resin layer contains urethane resin that does not have a fluorine atom in a molecular structure, and has self-repairability. The outer urethane resin layer contains urethane resin containing a fluorine atom in a molecular structure, and has self-repairability.

BRIEF DESCRIPTION OF THE DRAWINGS

Exemplary embodiments of the present invention will be described in detail based on the following figures, wherein.

DETAILED DESCRIPTION

Figure 1:
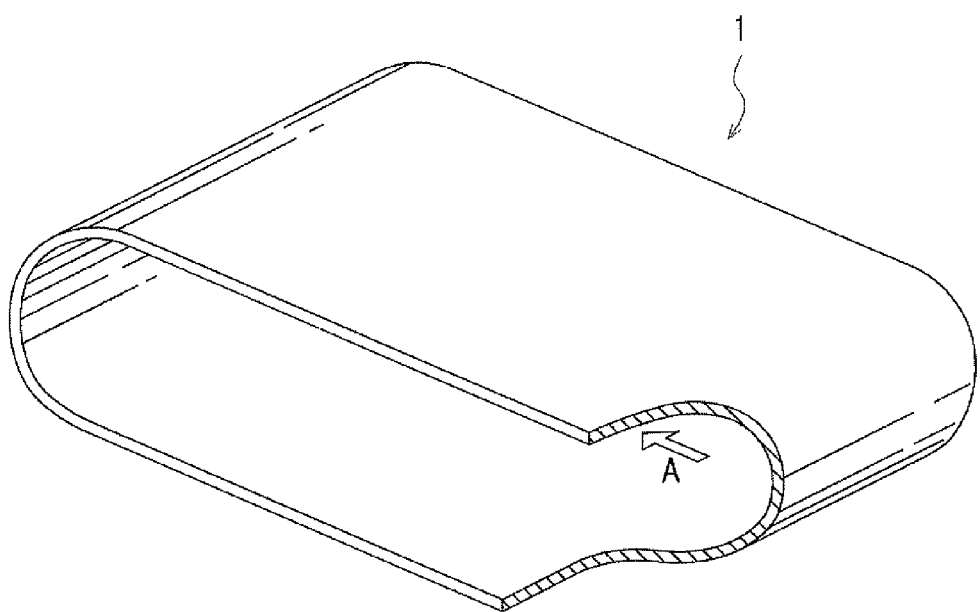
FIG. 1 is a perspective view showing the schematic configuration of a fixing belt related to the present exemplary embodiment.

An exemplary embodiment of a urethane resin laminate, a fixing roll and a fixing belt for an image forming apparatus, an image fixing device, a transparent plate for a platen, a document reader, and an image forming apparatus of the invention will be described below in detail.

The urethane resin laminate related to the present exemplary embodiment includes a substrate material of which the contact angle of water at least in one surface is from 0 degree to 90 degrees; an inner urethane resin layer including urethane resin that does not have a fluorine atom in a molecular structure and having self-repairability; and an outer urethane resin layer including urethane resin that has a fluorine atom in a molecular structure and having self-repairability in this order. The respective layers are provided so as to contact with each other.

For the purpose of the protection of the substrate material, the urethane resin layer having self-repairability may be formed on the surface of the substrate material. In that case, when the urethane resin layer including urethane resin that has a fluorine atom in a molecular structure is used from the viewpoints of giving mold releasability or resistance of staining to the urethane resin layer having self-repairability, there is a case where the adhesiveness between the urethane resin layer and the substrate material may not be obtained, or a coating liquid for forming the urethane resin layer may be repelled on the substrate material surface, and may not form the urethane resin layer.

In contrast, in the urethane resin laminate related to the present exemplary embodiment, the inner urethane resin layer including urethane resin that does not have a fluorine atom in a molecular structure and having self-repairability is interposed between the substrate material and the outer urethane resin layer including urethane resin that has a fluorine atom in a molecular structure and having self-repairability. As the outer urethane resin layer is laminated on the surface of the inner urethane resin layer, excellent adhesiveness may also be obtained due to the affinity between both the layers while giving the aforementioned mold releasability or resistance of staining.

Additionally, since both the outer urethane resin layer and the inner urethane resin layer have self-repairability, even in a case where cracks, such as an abrasion of the outer urethane resin layer, become deeper, the cracks are repaired, and occurrence of abrasion (permanent cracks) that remains forever is efficiently suppressed.

Moreover, in the substrate material in the urethane resin laminate related to the present exemplary embodiment, the contact angle of water of at least the surface formed with the inner urethane resin layer is within the aforementioned range. If the substrate material of which the numerical value of the contact angle of water is within the above range is used, the affinity with the inner urethane resin layer including urethane resin that does not have a fluorine atom in a molecular structure is obtained, and excellent adhesiveness is obtained. Additionally, it is also suppressed that the coating liquid for forming the inner urethane resin layer is repelled on the substrate material surface, and formation of the inner urethane resin layer is efficiently performed.

In addition, although a mechanism of the correlation between the substrate material of which the contact angle of water is within the aforementioned range and the inner urethane resin layer including urethane resin that does not have a fluorine atom in a molecular structure is not clear, the mechanism is inferred as follows. That is, since the contact angle of the resin that does not contain a fluorine atom is less than 90 degrees and the surface energy of the resin is similar to that of the substrate material of which the contact angle is within the aforementioned range, it is believed that wettability to the substrate material is improved, and therefore, the adhesiveness is raised.

—Definition of Self-Repairability—

Here, self-repairability refers to the property that repairs distortion produced according to stress when the stress is removed. Specifically, in the present specification, the self-repairability indicates that the "return rate" obtained by the following measuring method under service temperature is 80% or more.

Measuring Method of Return Rate

Fischerscope HM2000 (made by Fischer) is used as a measuring device, a coating liquid for forming the inner urethane resin layer or a coating liquid for forming the outer urethane resin layer is coated to a polyimide film and is polymerized to form a resin layer for a sample, and the resin layer for a sample is fixed to a glass slide with an adhesive and is set on the measuring device. A load is applied up to 0.5 mN to the resin layer for a sample over 15 seconds at a specific measurement temperature (service temperature), and the resin layer is held for 5 seconds with 0.5 mN. The maximum displacement in that case is defined as (h1). Then, a load is removed to 0.005 mN over 15 seconds, the displacement when the resin layer is held for 1 minute with 0.005 mN is defined as (h2), and then, the return rate [{(h1−h2)/h1}×100 (%)] at the temperature is calculated.

The return rate described in the present specification is measured by this method.

—Self-Repairing Temperature—

In addition, the temperature at which self-repairability is developed (that is, the temperature at which the return rate becomes 80% or more: self-repairing temperature) in the inner urethane resin layer and the outer urethane resin layer in the present exemplary embodiment may be any temperature as long as the temperature is within a temperature region where the form of the resin after the resin that forms the inner urethane resin layer and the outer urethane resin layer is formed as layers may be held. Accordingly, a "specific measurement temperature" in the measuring method of the return rate also targets any temperature within the temperature region.

Particularly, in a case where the urethane resin laminate applied to the present exemplary embodiment especially is applied to, for example, a fixing member (a fixing roll, a fixing belt, or the like) in an image forming apparatus, the self-repairing temperature in the inner urethane resin layer and the outer urethane resin layer is preferably from 80° C. to 280° C. and more preferably from 120° C. to 250° C.

Additionally, in a case where the urethane resin laminate applied to the present exemplary embodiment especially is applied to, for example, a transparent plate for a platen in a document reader, the self-repairing temperature in the inner urethane resin layer and the outer urethane resin layer is preferably from 0° C. to 80° C. and more preferably from 0° C. to 60° C.

Additionally, it is preferable that a temperature region of the self-repairability in the outer urethane resin layer is developed and a temperature region of the self-repairability in the inner urethane resin layer is developed overlap each other. As the temperature regions of both the self-repairing temperatures overlap each other, repairing of deeper cracks is also more efficiently performed.

—Temperature of Urethane Resin Laminate—

Even in a case where the inner urethane resin layer and the outer urethane resin layer in the urethane resin laminate related to present exemplary embodiment are put in temperature environments other than the temperature (self-repairing temperature) at which self-repairability is developed, repairing of cracks is appropriately performed by taking a longer time (for example, time exceeding 1 minute in a case where load is applied to cause cracks, on the same conditions as the measuring method of the return rate).

Here, from a viewpoint of repairing cracks more efficiently, it is preferable to use the inner urethane resin layer and outer urethane resin layer of the urethane resin laminate in an environment that provides a temperature (that is, a temperature at which the return rate becomes 80% or more: self-repairing temperature) at which the aforementioned self-repairability is developed.

For example, in a case where the urethane resin laminate related to the present exemplary embodiment is applied to a heat fixing type fixing member (a fixing roll, a fixing belt, or the like) in an image forming apparatus, the fixing member is used in a state where the fixing member is heated and the temperature thereof rises (for example, heated to a temperature of from 160° C. to 200° C.). Therefore, cracks can be more efficiently repaired by applying the inner urethane resin layer and the outer urethane resin layer that develop self-repairability in a temperature region where the fixing member reaches due to this heating.

Additionally, in a case where the urethane resin laminate related to the present exemplary embodiment is applied to a transparent plate for a platen in a document reader of an image forming apparatus, heat is imparted to the transparent plate for a platen by the heat produced from this image forming apparatus body (for example, heated to a temperature of from 20° C. to 50° C.) Therefore, cracks can be more efficiently repaired by applying the inner urethane resin layer and the outer urethane resin layer that develop self-repairability in a temperature region where the transparent plate for a platen reaches due to the heat produced from the image forming apparatus body.

—Contact Angle of Water in Substrate Material—

In the substrate material in the present exemplary embodiment, at least the surface formed with the inner urethane resin layer has a contact angle of water within the aforementioned range. Moreover, it is particularly preferable that the contact angle be from 10 degrees to 60 degrees.

In addition, the contact angle is adjusted by the material of the substrate material, surface treatment to the substrate material, or the like.

[Measuring Method]

The contact angle of water is measured by dropping 1 μl of a waterdrop on the surface of the substrate material by an injector and adopting the angle between the tangential line of the waterdrop and the surface of the substrate material as the contact angle. Specifically, well-known techniques such as a θ/2 method, a tangential line method, and a curve-fitting method may be used.

—Antireflection Layer—

When all the outer urethane resin layer, the inner urethane resin layer, and the substrate material that constitute the urethane resin laminate related to the present exemplary embodiment have transparency, a configuration in which the reflected light of the light incident from the outer urethane resin layer side is suppressed by adjusting the refractive indexes of the outer urethane resin layer and the inner urethane resin layer and the thickness of the outer urethane resin layer may be adopted. That is, the outer urethane resin layer and the inner urethane resin layer may be made to play the role of a anti-reflection layer by making the refractive indexes of the outer urethane resin layer and the inner urethane resin layer different from each other, and adjusting the layer thickness of the outer urethane resin layer to a layer thickness at which the phase of reflected light (L2) reflected by an interface between the outer urethane resin layer and the inner urethane resin layer is reversed with respect to the phase of reflected light (L1) provided such that the light incident from the outer urethane resin layer side is reflected by an outer surface of the outer urethane resin layer.

In addition, transparency means the property of transmitting light in a visible light region. In the present specification, transparency indicates being transparent to such a degree that the opposite side may be visually recognized even via at least the urethane resin laminate related to the present exemplary embodiment.

Additionally, the refractive indexes of the outer urethane resin layer and the inner urethane resin layer are measured by a digital Abbe's refractometer DR-A1 made by Atago Co., Ltd. after films (90 μm layer thickness) of individual urethane resin layer single bodies are prepared. The numerical values described in the present specification are measured by this method.

Since the refractive index of polymers generally changes depending on the molecular structure thereof or the aggregation state of a molecular chain, methods of adjusting the refractive index in the outer urethane resin layer and the inner urethane resin layer include a method of changing the kind, bulkiness, or polarity of methacrylic acid monomers as a material to form the urethane resin, and the like.

Subsequently, the configuration of the urethane resin laminate related to the present exemplary embodiment will be described.

<Urethane Resin Laminate>

—Inner Urethane Resin Layer—

The inner urethane resin layer includes urethane resin that does not have fluorine atoms in a molecular structure, and has self-repairability.

Materials used for the inner urethane resin layer preferably include, but are not limited to, urethane resins formed by polymerizing acrylic resin and isocyanate.

(a) Acrylic Resin

As the acrylic resin that constitutes the urethane resin of the inner urethane resin layer, acrylic resins having a hydroxyl group are preferable.

Examples of monomers for forming the acrylic resins include monomers having a hydroxyl group, which include (1) ethylenic monomers having a hydroxy group, such as hydroxymethyl (meth)acrylate, hydroxyethyl (meth)acrylate, hydroxypropyl (meth)acrylate, hydroxybutyl (meth)acrylate, and N-methylol arylamine. Additionally, (2) ethylenic monomers having a carboxyl group, such as (meth)acrylic acid, crotonic acid, itaconic acid, fumaric acid, and maleic acid, may be used. Moreover, as monomers that do not have a hydroxyl group, (3) ethylenic monomers capable of copolymerizing the monomers (1) and (2), such as alkyl ester (meth)acrylate such as methyl (meth)acrylate, ethyl (meth)acrylate, propyl (meth)acrylate, butyl (meth)acrylate, n-propyl (meth)acrylate, n-butyl (meth)acrylate, isobutyl (meth)acrylate, 2-ethylhexyl (meth)acrylate, n-ocytl (meth)acrylate, and n-dodecyl (meth)acrylate may be used together.

In addition, control methods for controlling the self-repairability of the inner urethane resin layer include a method of adjusting the amount of a side chain hydroxyl group (short side chain hydroxyl group) in which the carbon number in the above acrylic resins is less than 10 and adjusting the amount of a side chain hydroxyl group (long side chain hydroxyl group) in which the carbon number is 10 or more.

Particularly, when the urethane resin laminate related to the present exemplary embodiment is used, for example, in an environment where the temperature of a fixing member (a fixing roll, a fixing belt, or the like) or the like in an image forming apparatus is high, it is preferable to use acrylic resins in which the ratio ($[A]/([A]+[B])$) of the content molar quantity [A] of the side chain hydroxyl group (short side chain hydroxyl group) with a carbon number of less than 10 and the content molar quantity [B] of the side chain hydroxyl group (long side chain hydroxyl group) with a carbon number of 10 or more is 80% or more (including a case where the side chain hydroxyl group with a carbon number of 10 or more is not contained). Moreover, the ratio ($[A]/([A]+[B])$) is more preferably 90% or more.

When the acrylic resins are made to contain a long side chain hydroxyl group, those obtained by adding ϵ-caprolactone to 3 to 5 mols of hydroxymethyl (meth)acrylates are preferable as monomers for forming the acrylic resins.

The acrylic resins may be used singly or may be used in combination of two or more kinds thereof.

As to a method of synthesizing the acrylic resins in the present exemplary embodiment, they are synthesized by performing refinement after mixing the aforementioned monomers and performing ordinary radical polymerization, ionic polymerization, or the like.

(b) Isocyanate

The isocyanate that constitutes the urethane resin of the inner urethane resin layer functions as a cross-linking agent that cross-links the acrylic resins. Although not particularly limited, for example, methylene diisocyanate, toluene diisocyanate, hexamethylene diisocyanate, isophorone diisocyanate, and the like are preferably used as the isocyanate. Moreover, an isocyanurate type, a buret type, an adduct type, and the like that are oligomer of the hexamethylene diisocyanate may be used. The isocyanate may be used singly or may be used in combination of two or more kinds thereof. Moreover, isocyanate prepared by blocking a functional group so as not to react to a specific temperature may be used.

In addition, the ratio ($(i)/(ii)$) of the content (i) of the isocyanate to the amount (ii) of the hydroxyl group of the acrylic resin is preferably from 0.1 to 3, and more preferably from 1 to 1.5.

—Outer Urethane Resin Layer—

The outer urethane resin layer includes urethane resin that has a fluorine atom in a molecular structure, and has self-repairability.

Materials used for the outer urethane resin layer preferably include, but are not limited to, polymers having fluorine atoms contained therein, in the urethane resins formed by appropriately polymerizing acrylic resin and isocyanate. Specifically, a method using acrylic resin containing fluorine atoms in the polymerization of urethane resin or the like is exemplified.

(a') Acrylic Resin

As the acrylic resin that constitutes the urethane resin of the outer urethane resin layer, acrylic resins having a hydroxyl group are preferable.

Monomers for forming the acrylic resins include the monomers listed in the urethane resin of the outer urethane resin layer as they are.

In addition, control methods for controlling the self-repairability of the outer urethane resin layer include a method of adjusting the amount of a side chain hydroxyl group (short side chain hydroxyl group) in which the carbon number in the above acrylic resins is less than 10 and adjusting the amount of a side chain hydroxyl group (long side chain hydroxyl group) in which the carbon number is 10 or more.

Particularly, when the urethane resin laminate related to the present exemplary embodiment is used, for example, in an environment where the temperature of a fixing member (a fixing roll, a fixing belt, or the like) or the like in an image forming apparatus is high, it is preferable to use acrylic resins in which the ratio ([A]/([A]+[B])) of the content molar quantity [A] of the side chain hydroxyl group (short side chain hydroxyl group) with a carbon number of less than 10 and the content molar quantity [B] of the side chain hydroxyl group (long side chain hydroxyl group) with a carbon number of 10 or more is 80% or more (including a case where the side chain hydroxyl group with a carbon number of 10 or more is not contained). Moreover, the ratio ([A]/([A]+[B])) is more preferably 90% or more.

(Acrylic Resin Containing Fluorine Atom)

Additionally, the acrylic resin containing fluorine atoms includes copolymers obtained by adding 2-(perfluorobutyl) ethyl acrylate, 2-(perfluorohexyl)ethyl acrylate, 2-(perfluorohexyl)ethyl methacrylate, perfluorohexyl ethylene, or the like as monomers, to the aforementioned monomers and conducting polymerization.

The content of the fluorine atoms is preferably from 5% by weight to 50% by weight of the total urethane resin.

In addition, as a method of synthesizing the acrylic resins in the present exemplary embodiment, they are synthesized by performing refinement after mixing the aforementioned monomers and performing ordinary radical polymerization, ionic polymerization, or the like.

(b') Isocyanate

The isocyanate that constitutes the urethane resin of the outer urethane resin layer functions as a cross-linking agent that cross-links the acrylic resins. Although not particularly limited, for example, methylene diisocyanate, toluene diisocyanate, hexamethylene diisocyanate, isophorone diisocyanate, and the like are preferably used as the isocyanate. Moreover, an isocyanurate type, a buret type, an adduct type, and the like that are oligomer of the hexamethylene diisocyanate may be used. The isocyanates may be used singly or may be used in combination of two or more kinds thereof. Moreover, isocyanate prepared by blocking a functional group so as not to react to a specific temperature may be used.

In addition, the ratio ((i)/(ii)) of the content (i) of the isocyanate to the amount (ii) of the hydroxyl group of the acrylic resin is preferably from 0.1 to 3, and more preferably from 1 to 1.5.

Method of Forming Inner and Outer Urethane Resin Layers

Subsequently, methods of forming the inner and outer urethane resin layers in the present exemplary embodiment will be described by taking an example.

For example, a coating liquid for forming the inner urethane resin layer in which the (a) acrylic resin and the (b) isocyanate are mixed together and are defoamed under the reduced pressure is cast to a substrate surface (surface of which contact angle of water is within the aforementioned range), and is heated (for example, for 30 minutes at 85° C. and 1 hour at 160° C.) and cured.

In addition, when the blocked (b) isocyanate is used, heating and curing are made to a temperature or higher at which a block is separated. Additionally, a method of using a supersonic wave instead of the pressure reduction and defoaming, or leaving and defoaming a mixed solution may be performed.

Next, the (a') acrylic resin containing the fluorine atoms and the (b') isocyanate are mixed together and defoamed under the reduced pressure. Then, the defoamed mixture is cast to the surface of the inner urethane resin layer, and is heated (for example, for 30 minutes at 85° C. and 1 hour at 160° C.) and cured.

When the blocked isocyanate is used, as mentioned above, heating and curing are made to a temperature or higher at which a block is separated. Additionally, a method of using a supersonic wave instead of the pressure reduction and defoaming, or leaving and defoaming a mixed solution may be performed.

—Control of Self-Repairability—

A control method for controlling the numerical value of the return rate within the aforementioned range, that is, forming the urethane resin layers having self-repairability in the inner and outer urethane resin layers is performed by controlling the amount of a long side chain hydroxyl group and the amount of a short side chain hydroxyl group in the acrylic resins, and controlling the type, amount or the like of cross-linking agents. For example, the return rate tends to become larger as crosslink density is increased.

Although not particularly limited, the thickness of the inner urethane resin layer is preferably from 10 μm to 100 μm.

Additionally, although not particularly limited, the thickness of the outer urethane resin layer is preferably from 10 μm to 100 μm.

—Substrate Material—

The substrate material is applied without particular limitation if the substrate material satisfies that the contact angle of water at least in the surface formed with the inner urethane resin layer is within the aforementioned range. Additionally, the substrate material may have single-layer structure or may have a laminated structure, and if the substrate material has the laminated structure, it is sufficient that the contact angle of water of a layer that constitutes the surface on the side where the inner urethane resin layer is formed may be within the aforementioned range.

Examples of the substrate material include various materials, for example, a plastic material, a metallic material, a non-magnetic metallic material, a rubber material, a transparent material, and the like.

Plastic Material

The plastic material generally include those referred to as engineering plastics, for example, polyimide (PI), polyamide-imide (PAT), polybenzimidazole (PBI), polyether ether ketone (PEEK), polysulfone (PSU), polyether sulfone (PES), polyphenylene sulfide (PPS), polyether imide (PEI), all aromatic polyester (liquid crystal polymers), and the like.

The urethane resin laminate using the substrate material made of the plastic materials is applied to, for example, a fixing belt or the like to be used for an image fixing device of an image forming apparatus.

In addition, when the laminate is used as the fixing belt, among the plastic materials, thermosetting polyimide, thermoplastic polyimide, polyimide imide, polyether imide, and the like are preferable.

Additionally, the urethane resin laminate using the substrate material made of the plastic materials is applied to, for example, a fixing roll or the like to be used for an image fixing device of an image forming apparatus.

Metallic Material

The metallic material includes various metals and alloy materials, for example SUS, aluminum, nickel, copper, aluminum, iron, alloys thereof, and the like.

The urethane resin laminate using the substrate material made of the metallic materials is used to, for example, a fixing belt or the like to be used for an image fixing device of an image forming apparatus.

In addition, when the laminated is used as the fixing belt, the aforementioned plural plastic materials and metallic materials may be laminated.

Additionally, the urethane resin laminate using the substrate material made of the metallic materials is applied to, for example, a fixing roll or the like to be used for an image fixing device of an image forming apparatus.

Non-Magnetic Metal Material

Examples of the non-magnetic metal material include non-magnetic metal materials, such as gold, silver, copper, aluminum, zinc, tin, lead, bismuth, beryllium, antimony, and alloys thereof (alloys containing these metals).

The urethane resin laminate using the substrate material made of the non-magnetic metal materials is used as a fixing belt or the like in an electromagnetic induction type image fixing device in an aspect in which a layer (heat generating layer) made of the non-magnetic metal materials is laminated on a layer (foundation layer) made of the aforementioned plastic materials or metallic materials, or the like, and the inner and outer urethane resin layers (protective layers) are laminated on the heat generating layer.

Rubber Material

Examples of the rubber material include polyurethane rubber, ethylene propylene rubber (EPM), silicone rubber, fluororubber (FKM), and the like. Examples of the silicone rubber include RTV silicone rubber, HTV silicone rubber, and the like, and specifically include polydimethyl silicone rubber (MQ), methylvinyl silicone rubber (VMQ), methylphenyl silicone rubber (PMQ), fluorosilicone rubber (FVMQ), and the like.

The urethane resin laminate using the substrate material made of the rubber materials is applied to a fixing belt or the like in an image fixing device of an image forming apparatus in an aspect in which a layer (elastic layer) made of the rubber materials is laminated on a layer (foundation layer) made of the aforementioned plastic materials or metallic materials, or the like, and the inner and outer urethane resin layers (protective layers) are laminated on the elastic layer.

Additionally, the urethane resin laminate using the substrate material made of the rubber materials is used to a fixing roll or the like in an image fixing device of an image forming apparatus in an aspect in which a layer (elastic layer) made of the rubber materials is laminated on a cylindrical core made of the aforementioned plastic materials or metallic materials, or the like, and the inner and outer urethane resin layers (protective layers) are laminated on the elastic layer.

Transparent Material

Examples of the transparent material include, glass, an acrylic plate, a polycarbonate plate, and the like.

The urethane resin laminate using the substrate material made of the transparent materials is applied to, for example, transparent plates for a platen, such as platen glass to be used for a document reader.

Next, aspects where the urethane resin laminate related to the present exemplary embodiment is used as a fixing belt, a fixing roll, and a transparent plate for a platen will be described.

<Fixing Belt>

Figure 2:
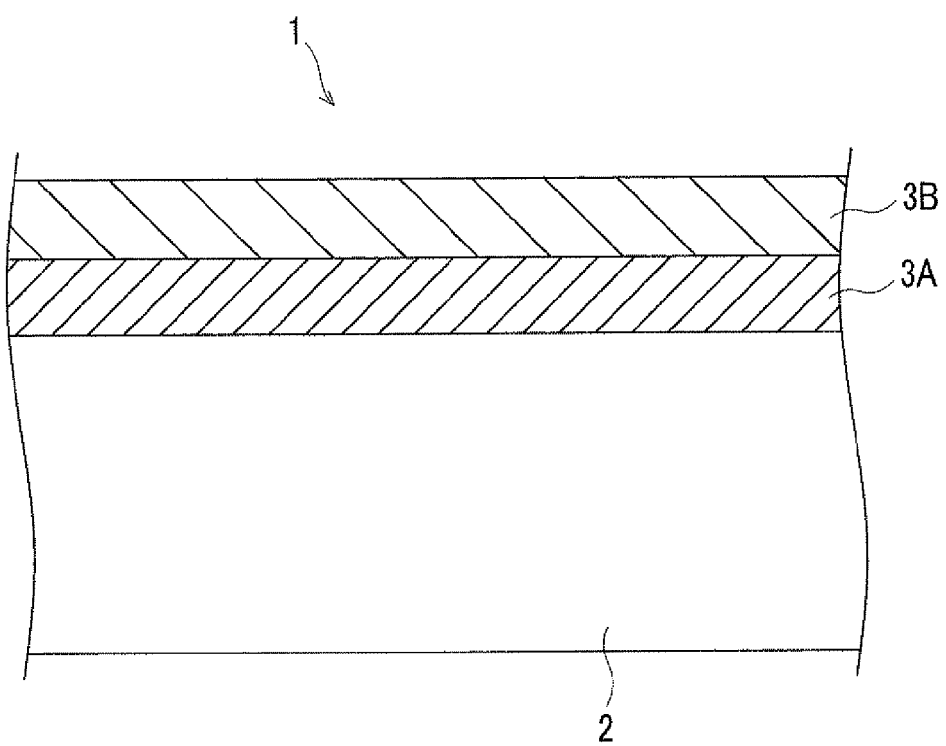
FIG. 2 is a cross-sectional view of the fixing belt related to the present exemplary embodiment.

FIG. 1 is a perspective view (a portion is shown in section) showing a fixing belt, and FIG. 2 is an end view of the fixing belt seen from the direction of an arrow A in FIG. 1.

As shown in FIGS. 1 and 2, the fixing belt 1 is an endless belt having a substrate material 2, an inner urethane resin layer 3A laminated on the surface of the substrate material 2, and an outer urethane resin layer 3B.

As the materials to be used for the substrate material 2 in the fixing belt 1, heat-resistant materials are preferable, and plastic materials, metallic materials, and the like are exemplified as mentioned above.

Additionally, in the substrate material 2 in the fixing belt 1, an elastic layer may be provided on a foundation layer made of the plastic materials or the metallic materials. Examples of the materials of the elastic layer include the aforementioned rubber materials.

Moreover, when the fixing belt 1 is used for an electromagnetic induction type image fixing device, as the substrate material 2, a heat generating layer is provided on the foundation layer made of the plastic materials or the metallic materials. Examples of the materials of the heat generating layer include the aforementioned non-magnetic metal materials.

When the fixing belt 1 is provided with the elastic layer, the thickness of the elastic layer is preferably within a range of from 100 μm to 3000 μm.

Moreover, when the fixing belt is provided with the heat generating layer, the thickness of the heat generating layer is preferably within a range of from 5 μm to 20 μm.

<Fixing Roll>

Figure 4:
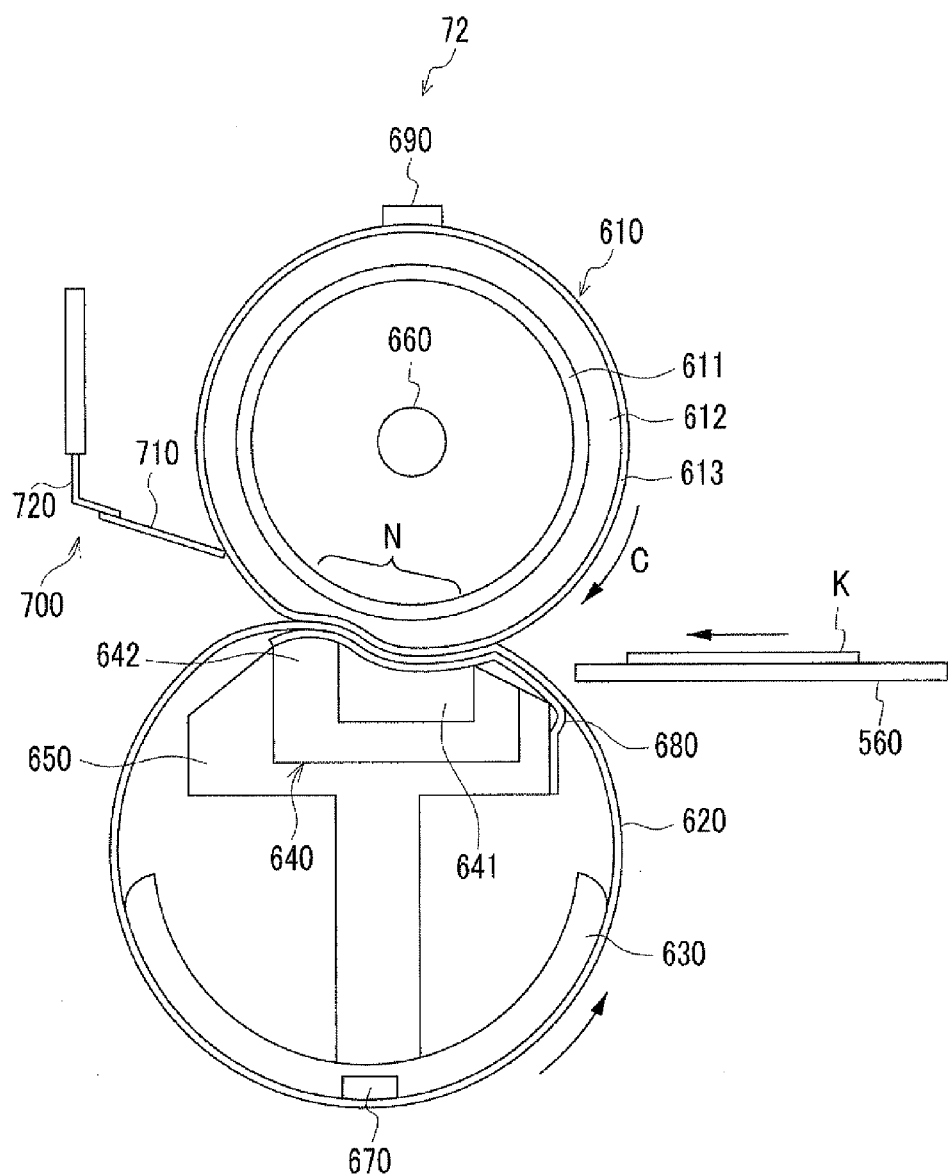
FIG. 4 is a schematic configuration diagram showing an image fixing device using the fixing belt related to the present exemplary embodiment.

Next, the fixing roll will be described with reference to FIG. 4. A fixing roll 610 shown in FIG. 4 is not particularly limited in terms of the shape, structure, size, or the like thereof, and includes a protective layer 613 composed of an inner urethane resin layer and an outer urethane resin layer on a cylindrical core material 611. Additionally, as shown in FIG. 4, the fixing roll may have an elastic layer 612 between the core material 611 and the protective layer 613.

As the materials to be used for the core material 611 in the fixing belt 610, heat-resistant materials are preferable, and plastic materials, metallic materials, and the like are exemplified as mentioned above. In addition, the fixing device 72 shown in FIG. 4 is constituted by a cylindrical body with an external diameter of ϕ25 mm, a thickness of 0.5 mm, and a length of 360 mm.

Examples of the materials to be used for the elastic layer 612 include the aforementioned rubber materials.

In addition, the thickness of the elastic layer 612 is preferably 3 mm or less, and more preferably within a range of from 0.5 mm to 1.5 mm. In the fixing device 72 shown in FIG. 4, HTV silicone rubber with a rubber hardness of 35° (JIS-A) covers a core material with a thickness of 72 μm.

The thickness (layer thickness of the inner urethane resin layer and the outer urethane resin layer) of the protective layer 613 is preferably from 5 μm to 1000 μm, and more preferably from 10 μm to 100 μm.

As a heating source that heats the fixing roll 610, for example, a halogen lamp 660 is used. Any heating sources may be selected according to purpose with no particular limitations if the heating sources are those having a shape and structure that are housed inside the core material 611. The surface temperature of the fixing roll 610 heated by the halogen lamp 660 is measured by a thermosensor 690 provided at the fixing roll 610, and the temperature is controlled to be constant by a control section. Examples of the thermosensor 690 include, but are not particularly limited to, a thermistor, a temperature sensor, and the like.

<Image Forming Apparatus and Image Fixing Device>

Next, an image forming apparatus using the fixing belt and the fixing roll will be described.

Figure 3:
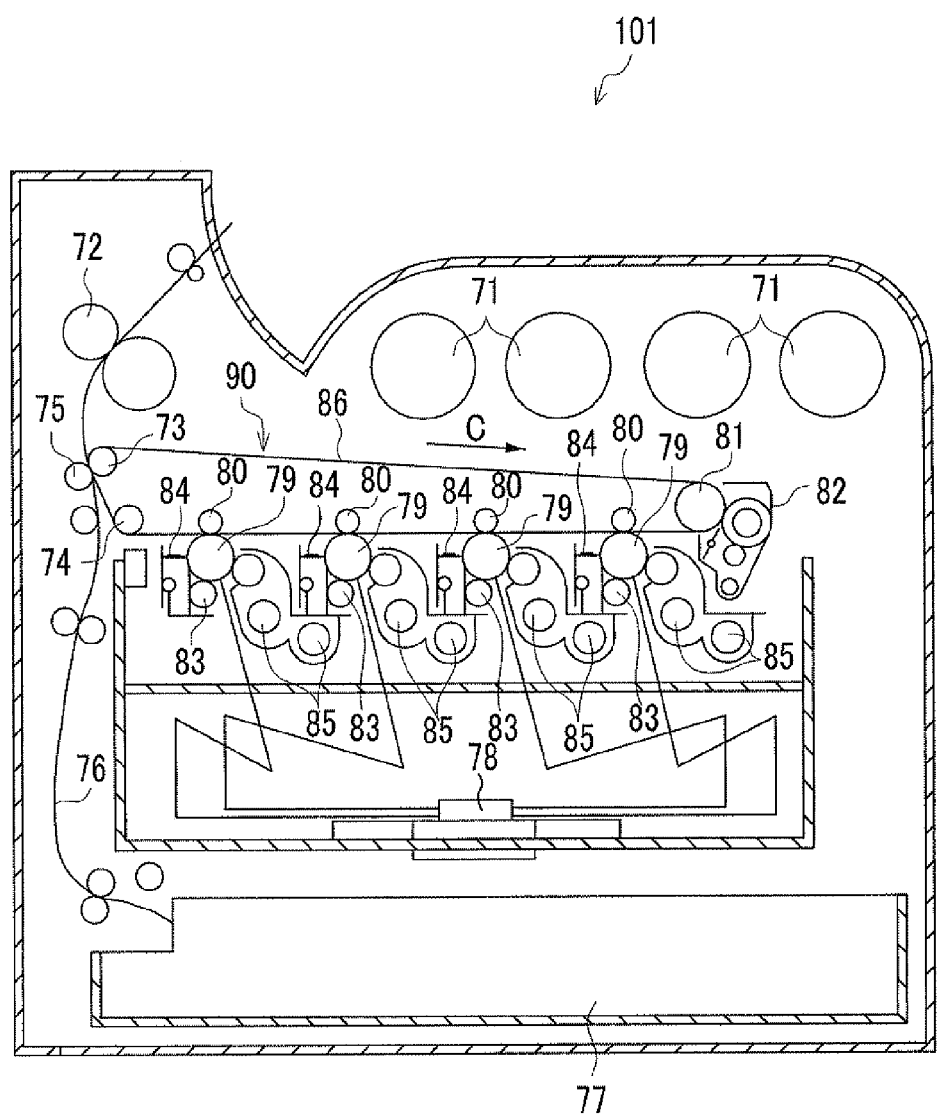
FIG. 3 is a schematic configuration diagram showing an image forming apparatus using the fixing belt related to the present exemplary embodiment.

FIG. 3 is a schematic view describing chief parts of a tandem type image forming apparatus including the fixing belt as a pressure belt of a fixing device and including the fixing roll as a fixing roll of a fixing device.

Specifically, an image forming apparatus 101 includes a photoconductor 79 (electrostatic latent image holding member), a charging roll 83 that charges the surface of the photoconductor 79, a laser generator 78 (electrostatic latent image forming section) that exposes the surface of the photoconductor 79 and forms an electrostatic latent image, a developing component 85 (developing section) that develops the latent image formed on the surface of the photoconductor 79 using a developer and forms a toner image, an intermediate transfer belt 86 (intermediate transfer member) to which the toner image formed by the developing component 85 is transferred from the photoconductor 79, a primary transfer roll 80 (primary transfer section) that transfers the toner image to the intermediate transfer belt 86, a photoconductor cleaning member 84 that removes the toner, dust, or the like adhering to the photoconductor 79, a secondary transfer roll 75 (secondary transfer section) that transfers the toner image on the intermediate transfer belt 86 to a recording medium, and a fixing device 72 (fixing section) that fixes the toner image on the recording medium. The primary transfer roll 80 may be arranged immediately above the photoconductor 79 as shown in FIG. 3, or may be arranged at a position shifted from immediately above the photoconductor 79.

Moreover, the configuration of the image forming apparatus 101 shown in FIG. 3 will be described in detail.

In the image forming apparatus 101, the charging roll 83, the developing component 85, the primary transfer roll 80 arranged via the intermediate transfer belt 86, and the photoconductor cleaning member 84 are arranged counterclockwise around the photoconductor 79, and one set of these members form a developing unit corresponding to one color. Additionally, every developing unit is provided with a toner cartridge 71 that replenishes the developing component 85 with a developer, and the photoconductor 79 of each developing unit is provided with the laser generator 78 that irradiates the surface of the photoconductor 79 on the downstream side (in the rotational direction of the photoconductor 79) of the charging roll 83 and on the upstream side of the developing component 85 with a laser beam according to image information.

Four developing units corresponding to four colors (for example, cyan, magenta, yellow, black) are horizontally arranged in series within the image forming apparatus 101, and the intermediate transfer belt 86 is provided so as to pass through transfer regions between the photoconductors 79 and the primary transfer rolls 80 of the four developing units. The intermediate transfer belt 86 is supported and driven by a supporting roll 73, a supporting roll 74, and a driving roll 81, which are provided counterclockwise in this order on the inner surface side of the belt, while imparting tension, and forms a belt driving device 90. In addition, four primary transfer rolls are located on the downstream side (in the rotational direction of the intermediate transfer belt 86) of the supporting roll 73, and on the upstream side of the supporting roll 74. Additionally, the transfer cleaning member 82 that cleans the outer peripheral surface of the intermediate transfer belt 86 is provided opposite to the driving roll 81 via the intermediate transfer belt 86 so as to contact with the driving roll 81.

Additionally, the secondary transfer roll 75 for transferring a toner image formed on the outer peripheral surface of the intermediate transfer belt 86 to the surface of a recording sheet transported via a sheet path 76 from a sheet supply unit 77 is provided opposite to the supporting roll 73 via the intermediate transfer belt 86 so as to contact with the supporting roll 73.

Additionally, the sheet supply section 77 that accommodates recording media is provided at the bottom of the image forming apparatus 101, and a recording medium is supplied so as to pass through a contact portion between the supporting roll 73 and the secondary transfer roll 75 constituting a secondary transfer section via the sheet path 76 from the sheet supply section 77. The recording medium that has passed through this contact portion is further transported by a transporting section (not shown) so as to pass through the contact portion of the fixing device 72, and is finally discharged to the outside of the image forming apparatus 101.

Next, an image formation method using the image forming apparatus 101 shown in FIG. 3 will be described. Formation of a toner image is performed in every developing unit, and the surfaces of the photoconductor 79 rotated counterclockwise by the charging roll 83 is charged. Thereafter, a latent image (electrostatic latent image) is formed on the surface of the photoconductor 79 charged by the laser generator 78 (exposure device). Next, this latent image is developed with the developer supplied from the developing component 85 to form a toner image, and the toner image carried to the contact portion between the primary transfer roll 80 and the photoconductor 79 is transferred to the outer peripheral surface of the intermediate transfer belt 86 that rotates in the direction of an arrow C. In addition, the photoconductor 79 after the toner image is transferred has toner, dust, or the like adhering to the surface thereof cleaned by the photoconductor cleaning member 84, and is prepared for the formation of the next toner image.

Toner images developed in the individual developing units for the individual colors are carried to the secondary transfer section in a state where the toner images are sequentially superimposed on the outer peripheral surface of the intermediate transfer belt 86 so as to correspond to image information, and are transferred to the surface of a recording sheet, which is transported via the sheet path 76 from the sheet supply section 77, by the secondary transfer roll 75. The recording sheet to which the toner images are transferred is subjected to fixing by being pressurized and heated when the sheet further passes through the contact portion of the fixing device 72, and an image is fixed on the surface of the recording medium. Thereafter, the recording sheet is discharged to the outside of the image forming apparatus.

—Fixing Device (Image Fixing Device)—

FIG. 4 is a schematic configuration diagram of the fixing device 72 provided within the image forming apparatus 101 related to the present exemplary embodiment. The fixing device 72 shown in FIG. 4 includes the fixing roll 610 as a rotating member that is rotationally driven, a fixing belt 620 (pressure belt), and a pressure pad 640 that is a pressure member that pressurizes the fixing roll 610 via the fixing belt 620. In addition, in the pressure pad 640, it is sufficient that the fixing belt 620 and the fixing roll 610 may be relatively pressurized. Accordingly, the fixing belt 620 side may be pressurized to the fixing roll 610, and the fixing roll 610 side may be pressurized to the fixing belt 620.

The halogen lamp 660 that is an example of a heating member that heats an unfixed toner image in a nip region is disposed inside the fixing roll 610. The heating member is not limited to the halogen lamp, and other heat generating members that generate heat may be used.

On the other hand, the thermosensor 690 is arranged in contact with the surface of the fixing roll 610. On the basis of the thermometry value by the thermosensor 690, the lighting of the halogen lamp 660 is controlled, and the surface temperature of the fixing roll 610 is maintained at a preset temperature (for example, 150° C.).

The fixing belt 620 is rotatably supported by the pressure pad 640 and a belt traveling guide 630 arranged therein, and an edge guide (not shown). The fixing belt 620 is arranged in contact with the fixing roll 610 in the nip region N in a state where the fixing belt is pressurized to the fixing roll.

The pressure pad 640 is arranged in a state where the pressure pad is pressurized to the fixing roll 610 via the fixing belt 620 inside the fixing belt 620, and forms the nip region N between the pressure pad and the fixing roll 610. In the pressure pad 640, a pre-nipping member 641 for holding the wide nip region N is arranged on the inlet side of the nip region N, and a peeling and nipping member 642 for giving distortion to the fixing roll 610 is arranged on the outlet side of the nip region N.

Moreover, in order to make the sliding resistance with the inner peripheral surface of the fixing belt 620 and the pressure pad 640, small, the surfaces of the pre-nipping member 641 and the peeling and nipping member 642 in contact with the fixing belt 620 are provided with a low-friction sheet 680. The pressure pad 640 and the low-friction sheet 680 are held by a metallic holder 650.

Moreover, the belt traveling guide 630 is attached to the holder 650, and is configured so that the fixing belt 620 may rotate smoothly. That is, since the belt traveling guide 630 is rubbed against the inner peripheral surface of the fixing belt 620, the belt traveling guide is formed from a material with a small static friction coefficient. Additionally, the belt traveling guide 630 is formed from a material with low heat conductivity so as not to easily take heat from the fixing belt 620.

The fixing roll 610 rotates in the direction of an arrow C by a drive motor (not shown), and the fixing belt 620 rotates in a direction opposite to the rotational direction of the fixing roll 610 so as to follow the rotation of the fixing roll. That is, the fixing roll 610 rotates in the clockwise direction in FIG. 4, whereas the fixing belt 620 rotates in the counterclockwise direction.

A sheet K having an unfixed toner image is guided by a fixing inlet guide 560, and is transported to the nip region N. Then, when the sheet K passes through the nip region N, a toner image on the sheet K is fixed by the pressure that acts on the nip region N and the heat supplied from the fixing roll 610.

In the fixing device 72, the nip region N is secured by the concave pre-nipping member 641 that resembles the outer peripheral surface of the fixing roll 610.

Additionally, the fixing device 72 is configured so that the distortion of the fixing roll 610 may become large locally in an outlet region of the nip region N by arranging the peeling and nipping member 642 so as to project with respect to the outer peripheral surface of the fixing roll 610. Through this configuration, the sheet K after fixing is peeled from the fixing roll 610.

Additionally, as an auxiliary section for peeling, a peeling member 700 is disposed on the downstream side of the nip region N of the fixing roll 610. In the peeling member 700, a peeling baffle 710 is held by a holder 720 in a state where the peeling baffle 710 is closely positioned to the fixing roll 610 in a direction (counter direction) opposite to the rotational direction of the fixing roll 610.

Members other than the fixing belt 620 and the fixing roll 610 to be used for the fixing device 72 will be described below in detail.

The pressure pad 640 arranged inside the fixing belt 620 is constituted by the pre-nipping member 641 and the peeling and nipping member 642 as described above, and is supported by the holder 650 so that the fixing roll 610 may be pushed with the load of, for example, 32 kgf by a spring or an elastic body. The surface of the pressure pad on the fixing roll 610 side is formed in the shape of a concave curved surface that corresponds with the outer peripheral surface of the fixing roll 610. Additionally, it is preferable that each material has heat resistance.

In addition, the pressure pad 640 arranged inside the fixing belt 620 is not particularly limited in terms of shape or material if the pressure pad has the function of pressurizing the fixing roll 610 via the fixing belt 620 and forming the nip region N through which a sheet K holding an unfixed toner image passes between the fixing belt 620 and the fixing roll 610. In addition to the pressure pad 640, a pressure roll that rotates while pressurizing the fixing roll 610 may be arranged in parallel.

Elastic bodies, such as heat-resistant elastomers such as silicone rubber and fluororubber, and a plate spring, are used for the pre-nipping member 641, and silicone rubber is preferable among these materials. Examples of the silicone rubber include RTV silicone rubber, HTV silicone rubber, and the like, and specifically include polydimethyl silicone rubber (MQ), methylvinyl silicone rubber (VMQ), methylphenyl silicone rubber (PMQ), fluorosilicone rubber (FVMQ), and the like. Silicone rubber with a JIS-A hardness of 10 to 40° is preferably used from a viewpoint of hardness. The shape, structure, size, or the like of the elastic body is not particularly limited, and is selected according to purpose. In the fixing device 72, silicone rubber with a width of 10 mm, a thickness of 5 mm, and a length of 320 mm is used.

The peeling and nipping member 642 is formed from resins having heat resistance, such as PPS (polyphenylene sulfide), polyimide, polyester, and polyamide, or metals such as iron, aluminum, and SUS. As for the shape of the peeling and nipping member, the outer surface in the nip region N is formed in the shape of a convex curved surface having a constant curvature radius. In the fixing device 72 of the present exemplary embodiment, the fixing belt 620 is wrapped around the fixing roll 610 at a winding angle of 40° by the pressure pad, and forms the nip region N with a width of 8 mm.

The low-friction sheet 680 is provided in order to reduce the sliding resistance (frictional resistance) between the inner peripheral surface of the fixing belt 620 and the pressure pad 640, and a material with a small coefficient of friction is suitable for the low-friction sheet.

Although various materials, such as metal, ceramics, and resin, are adopted as the material of the low-friction sheet 680, specifically, 6-nylon, natural materials of 6,6-nylon, and materials obtained by adding carbon, glass fiber, or the like to these are used in addition to fluororesin, polyethersulfon (PES), polybutylene terephthalate (PBT), liquid crystal polymer (LCP), polyphenylene sulfide (PPS), polyethylene terephthalate (PET), and the like that are heat-resistant resins.

Among these, a fluororesin sheet is preferable in which the sliding resistance with the inner surface of the fixing belt 620 is small on the contact surface side with the fixing belt 620, and a fine concavo-convex shape is provided on the surface on which lubricant is held.

Specifically, a PTFE resin sheet molded by sintering, a glass fiber sheet impregnated with a Teflon (registered trademark), a laminated sheet obtained by heating, fusing, and sandwiching a skive film sheet made of fluororesin to glass fiber, a sheet obtained by providing a fluororesin sheet with streaky irregularities, and the like are used.

In addition, the low-friction sheet 680 may be configured separately from the pre-nipping member 641 and the peeling and nipping member 642 or may be configured integrally with the pre-nipping member 641 and the peeling and nipping member 642.

Moreover, a lubricant application member 670 is disposed along the longitudinal direction of the fixing device 72 at the holder 650. The lubricant application member 670 is arranged so as to contact with the inner peripheral surface of the fixing belt 620, and supplies lubricant. This allows lubricant to be supplied to a sliding portion between the fixing belt 620 and the low-friction sheet 680, and reduces the sliding resistance between the fixing belt 620 and the pressure pad via the low-friction sheet 680.

Silicone oil is preferable as the lubricant, and dimethyl silicone oil, organic metal salt-added dimethyl silicone oil, hindered amine-added dimethyl silicone oil, organic metal salt and hindered amine-added dimethyl silicone oil, methylphenyl silicone oil, amino-modified silicone oil, organic metal salt-added and amino-modified silicone oil, hindered amine-added and amino-modified silicone oil, carboxy-modified silicone oil, silanol-modified silicone oil, sulfonic acid-modified silicone oil, and the like are used as the silicone oil. However, the amino-modified silicone oil having excellent wettability is more preferable.

In addition, although lubricant is supplied to the inner peripheral surface of the fixing belt 620 by the lubricant application member 670 in the fixing device 72, a form in which the lubricant application member and lubricant are not used may be adopted.

Additionally, it is also preferable to use methylphenyl silicone oil, fluorine oil (perfluoropolyether oil or modified perfluoropolyether oil), or the like. In addition, an antioxidant may be added into silicone oil. In addition, synthetic lubricating oil grease obtained by mixing a solid substance with a liquid, for example, silicone grease, fluorine grease, and combinations thereof are also used. In the fixing device 72, amino-modified silicone oil (KF96 made by Shin-etsu Chemical Co., Ltd.) with a viscosity of 300 CS is used.

Additionally, since the belt traveling guide 630 is rubbed against the inner peripheral surface of the fixing belt 620 as described above, a material with a low coefficient of friction and with low heat conductivity so as not to easily take heat from the fixing belt 620 is suitable and heat-resistant resins, such as PFA and PPS, are used.

In addition, in the image forming apparatus 101 of the present exemplary embodiment, the aforementioned fixing belt is used as the fixing belt 620 of the fixing device 72. However, the aforementioned fixing belt may be used as the intermediate transfer belt 86.

—Another Aspect of Fixing Device (Image Fixing Device)—

Next, a fixing device of another aspect will be described.

Figure 5:
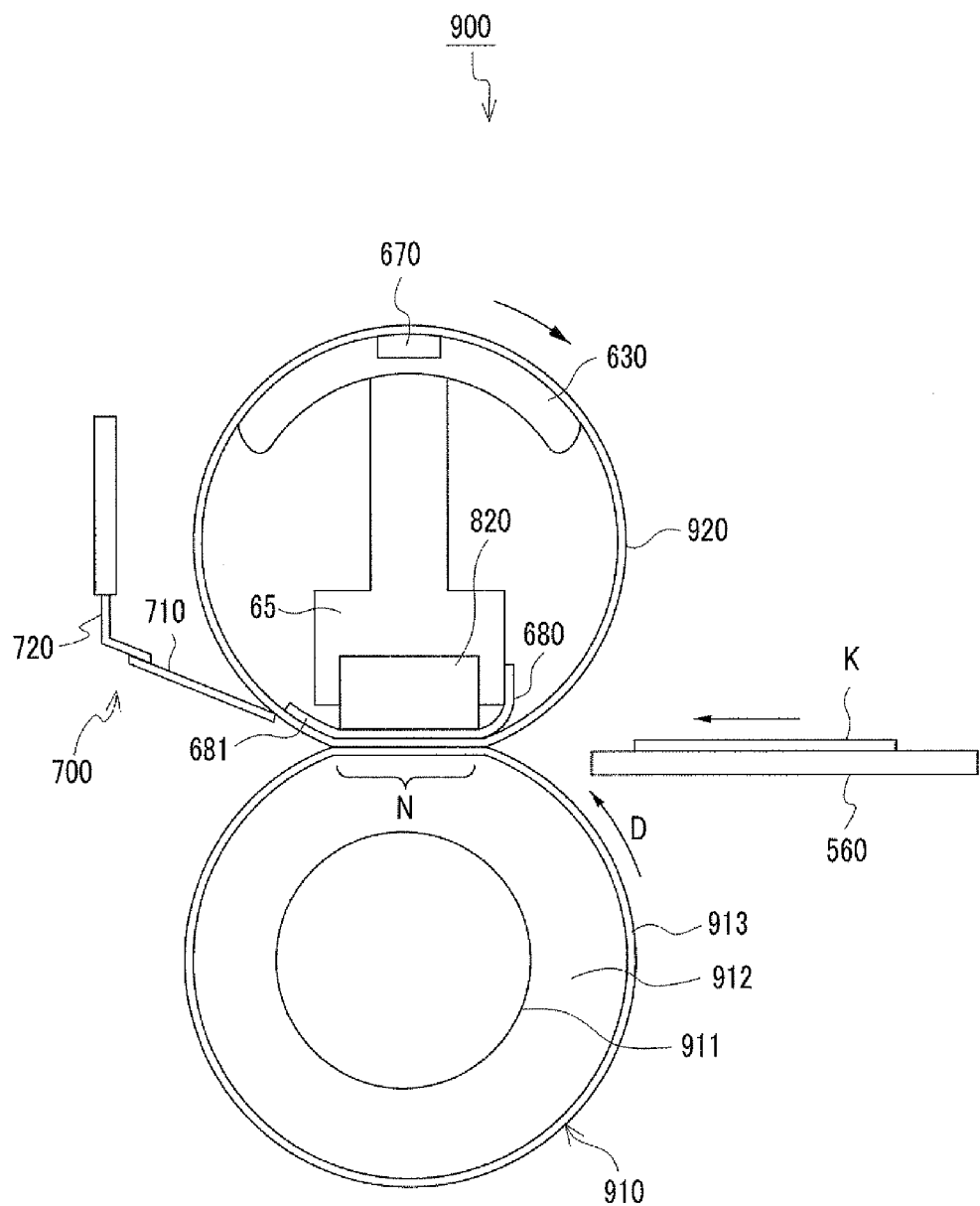
FIG. 5 is a schematic configuration diagram showing another image fixing device using the fixing belt related to the present exemplary embodiment.

FIG. 5 is a schematic configuration diagram of a fixing device of another aspect, and shows a form in which a fixing device including a fixing belt (the aforementioned fixing belt) including a heating source, a pressure roll (the aforementioned roll) is used.

FIG. 5 shows a fixing device including the aforementioned fixing belt as a fixing belt and including the aforementioned roll as a pressure roll.

A fixing device 900 shown in FIG. 5 incldes a fixing belt 920 as a fixing belt, and a pressure roll 910 as an example of a rotating member that is rotationally driven. The fixing belt 920 is configured similarly to the above-described fixing belt 620.

The fixing belt 920 is arranged on the toner image carrying surface side of a sheet K, a ceramic heater 820 that is a resistance heating element as an example of a heating member is disposed inside the fixing belt 920 so as to supply heat to the nip region N from the ceramic heater 820.

The surface of the ceramic heater 820 on the pressure roll 910 side is flatly formed. Also, the ceramic heater is arranged in a state where the ceramic heater is pressurized to the pressure roll 910 via the fixing belt 920, and forms the nip region N. Accordingly, the ceramic heater 820 also functions as a pressure member. The sheet K that has passed through the nip region N is peeled from the fixing belt 920 due to a change in the curvature of the fixing belt 920 in an outlet region (peeling and nipping portion) of the nip region N.

Moreover, the low-friction sheet 680 is disposed between the inner peripheral surface of the fixing belt 920 and the ceramic heater 820 in order to make the sliding resistance between the inner peripheral surface of the fixing belt 920 and the ceramic heater 820 small. The low-friction sheet 680 may be configured separately from the ceramic heater 820, or may be configured integrally with the ceramic heater 820.

On the other hand, the pressure roll 910 is configured so as to face the fixing belt 920, and rotates in a direction of an arrow D by a drive motor (not shown), and the fixing belt 920 rotates so as to follow the rotation of the pressure roll. The pressure roll 910 is configured such that a core (columnar core) 911, a heat-resistant elastic layer 912 that coats the outer peripheral surface of the core 911, and a release layer 913 coated with heat-resistant resin or coated with heat-resistant rubber are laminated, and the respective layers are formed to have semi-conductivity by the addition of carbon black or the like as measures against the offset of toner if needed.

Additionally, as an auxiliary section for peeling, the peeling member 700 may be disposed on the downstream side of the nip region N of the fixing belt 920. In the peeling member 700, a peeling baffle 710 is held by the holder 720 in a state where the peeling baffle 710 is closely positioned to the fixing belt 920 in a direction (counter direction) opposite to the rotational direction of the fixing belt 920.

A sheet K having an unfixed toner image is guided by the fixing inlet guide 560, and is transported to the nip region N of the fixing device 900. Then, when the sheet K passes through the nip region N, a toner image on the sheet K is fixed by the pressure that acts on the nip region N and the heat supplied from the ceramic heater on the fixing belt 920 side.

Here, in the fixing device 900 in the present exemplary embodiment, the pressure roll 910 is formed in an inverted crown shape (flare shape) in which the external diameter of both ends is larger than the external diameter of a central portion, and the fixing belt 920 also has a concavo-convex shape on the inner surface thereof. This concavo-convex shape is configured so as to be expanded and deformed in a shape along the surface shape of the pressure roll 910 in the nip region. By adopting such a configuration, when a sheet passes through the nip region, a tensile force acts on the sheet in the width direction by the pressure roll 910 from the central portion of the sheet toward both ends thereof, whereby the sheet is extended, and the length of the fixing belt 920 in the surface width direction is also extended.

In addition, the heating source may be a halogen lamp provided inside the fixing belt 920 or a heating source using electromagnetic induction heat generation by an electromagnetic induction coil provided inside or outside the fixing belt 920, in addition to the ceramic heater 820.

Additionally, a pressure roll that rotates while pressurizing the pressure roll 910 may be provided in parallel inside the fixing belt 920 in addition to a flat pressure member.

<Transparent Plate for Platen>

The transparent plate for a platen related to the present exemplary embodiment has a substrate material having transparency, and an inner urethane resin layer and an outer urethane resin layer laminated on the surface of the substrate material.

Examples of the materials to be used for the substrate material in the transparent plate for a platen includes the transparent materials or the like as mentioned above.

The thickness of the substrate material made of the transparent materials is not particularly limited.

<Document Reader and Image Forming Apparatus>

Next, a document reader and an image forming apparatus related to the present exemplary embodiment will be described with reference to the drawings.

Figure 6:
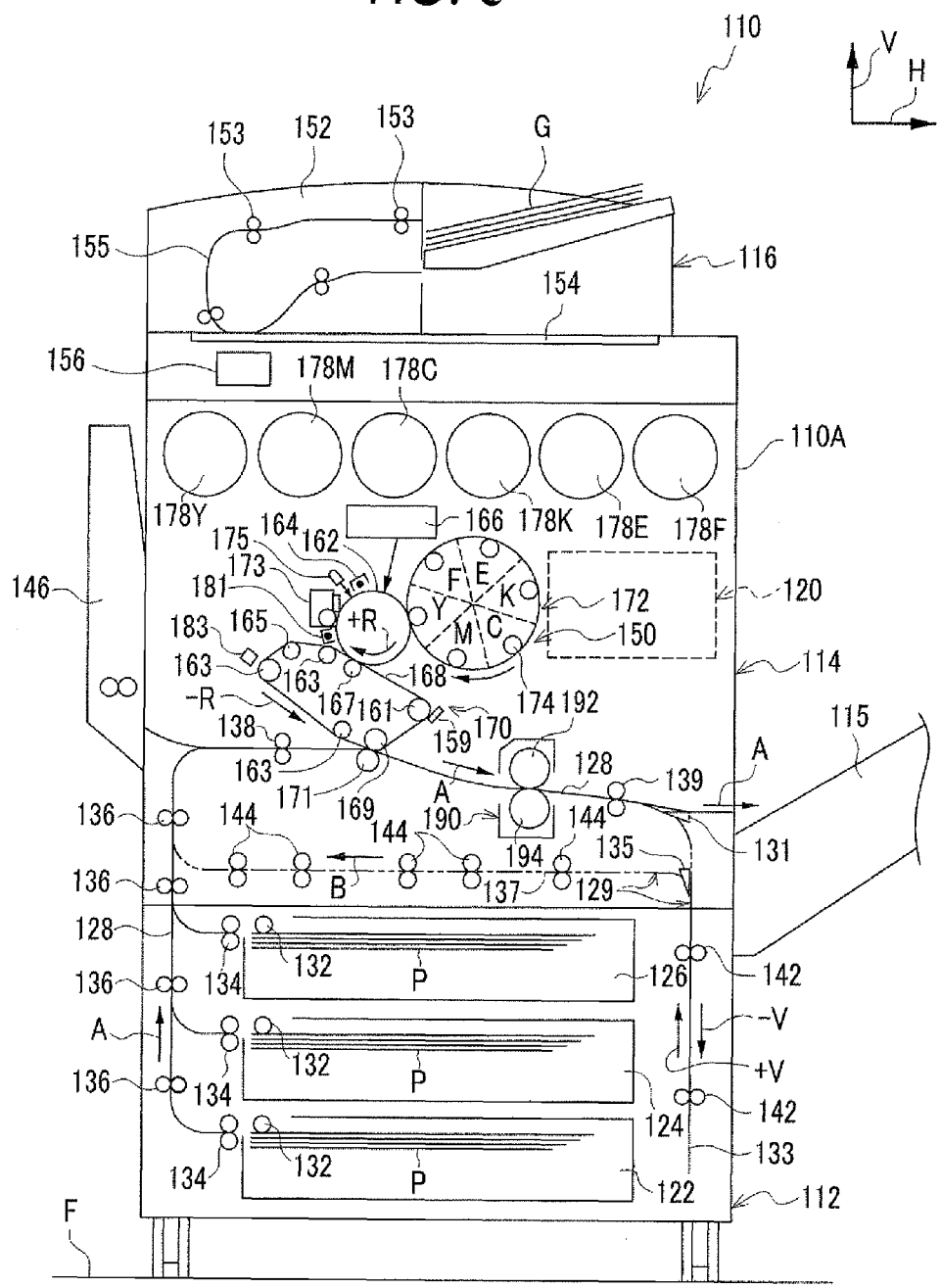
FIG. 6 is an overall configuration diagram of the image forming apparatus related to the present exemplary embodiment.

An electrophotographic image forming apparatus including a document reader as an example of the present exemplary embodiment is shown in FIG. 6.

The image forming apparatus 110 includes a sheet accommodating section 112 that accommodates recording sheets P, an image forming section 114 that is provided on the sheet accommodating section 112 to perform image formation on a recording sheet P as an example of a recording medium to be supplied from the sheet accommodating section 112, a document reader 116 that is provided on the image forming section 114 to read a reading document G, and a control section 120 that is provided within the image forming section 114 to control the operation of the respective parts of the image forming apparatus 110, toward the top from the bottom in the vertical direction (direction of an arrow V). In addition, in the following description, the vertical direction of an apparatus body 110A of the image forming apparatus 110 is described as the direction of an arrow V, and the horizontal direction is described as the direction of an arrow H.

Sheet Accommodating Part

The sheet accommodating section 112 include a first accommodating portion 122, a second accommodating portion 124, and a third accommodating portion 126 that accommodate recording sheets P with different sizes. Each of the first accommodating portion 122, the second accommodating portion 124, and the third accommodating portion 126 is provided with a supply roll 132 that delivers the accommodated recording sheet P to a feeding path 128 provided within the image forming apparatus 110. A pair of feed rolls 134 and a pair of feed rolls 136 that transport the recording sheets P one by one, are provided closer to the downstream side than the supply roll 132 in the feeding path 128. Additionally, an alignment roll 138 that stops a recording sheet P and delivers the recording sheet to a secondary transfer position to be described below at predetermined timing is provided closer to the downstream side than the feed rolls 136 in the transporting direction of the recording sheet P in the feeding path 128.

An upstream portion of the feeding path 128 is provided in the shape of a straight line from the left of the sheet accommodating section 112 to a left lower portion of the image forming section 114 toward the direction of an arrow V in the plane view of the image forming apparatus 110. Additionally, a downstream portion of the feeding path 128 is provided from the left lower portion of the image forming section 114 to a discharge section 115 provided on the right side face of the image forming section 114. Moreover, a double-side feeding path 129 with which a recording sheet P is transported and reversed is connected to the feeding path 128 in order to perform image formation on both sides of the recording sheet P.

The double-side feeding path 129 has, in the plane view of the image forming apparatus 110, a first switching member 131 that performs switching between the feeding path 128 and the double-side feeding path 129, a reversal portion 133 that is provided in the shape of a straight line in the direction (in the drawing, a downward direction is −V and an upward direction is +V) of the arrow V from a right lower portion of the image forming section 114 to the right of the sheet accommodating section 112, a transporting portion 137 into which a trailing edge of a recording sheet P transported by the reversal portion 133 advances and is transported to the left in the drawing in the direction of the arrow H, and a second switching member 135 that performs switching between the reversal portion 133 and the transporting portion 137. Plural feed roll pairs 142 are provided at intervals at the reversal portion 133, and plural feed roll pairs 144 are provided at intervals at the transporting portion 137.

The first switching member 131 is a triangular prism-shaped member, and the transporting direction of a recording sheet P is switched as a leading edge portion of the recording sheet is moved to either the feeding path 128 or the double-side feeding path 129 by a driving section (not shown). Similarly, the second switching member 135 is a triangular prism-shaped member in plane view, and the transporting direction of a recording sheet P is switched as a leading edge portion of the recording sheet is moved to either the reversal portion 133 or the transporting portion 137 by a driving section (not shown). In addition, a downstream end of the transporting portion 137 is connected to the near side of the feed rolls 136 at the upstream portion of the feeding path 128 by a guide member (not shown). Additionally, a foldable manual sheet feed portion 146 is provided at the left side face of the image forming section 114, and the feeding path of a recording sheet P sent in from the manual sheet feed portion 146 is connected to a portion before the alignment roll 138 of the feeding path 128.

Document Reader

The document reader 116 is provided with a document transporting device (document transporting section) 152 that automatically transports reading documents G one by one, a transparent plate 154 for a platen as an example of a document platen that is arranged below the document transporting device 152 and has one reading document G placed thereon, a document reading section 156 as an example of a reading section that reads the reading document G transported by the document transporting device 152 or the reading document G placed on the transparent plate 154 for a platen. In addition, in the present exemplary embodiment, the transparent plate for a platen related to the aforementioned present exemplary embodiment is used as the transparent plate 154 for a platen.

The document feeding device 152 has an automatic feeding path 155 along which plural feed roll pairs 153 are arranged, and a portion of the automatic feeding path 155 is arranged so that a reading document G may pass above the transparent plate 154 for a platen. Additionally, the document reading section 156 reads the reading document G fed by the document feeding device 152 in a state where the reading document is stopped at a left end portion of the transparent plate 154 for a platen, or reads the reading document G placed on the transparent plate 154 for a platen, while moving in the direction of the arrow H.

Operation Panel

Figure 7:
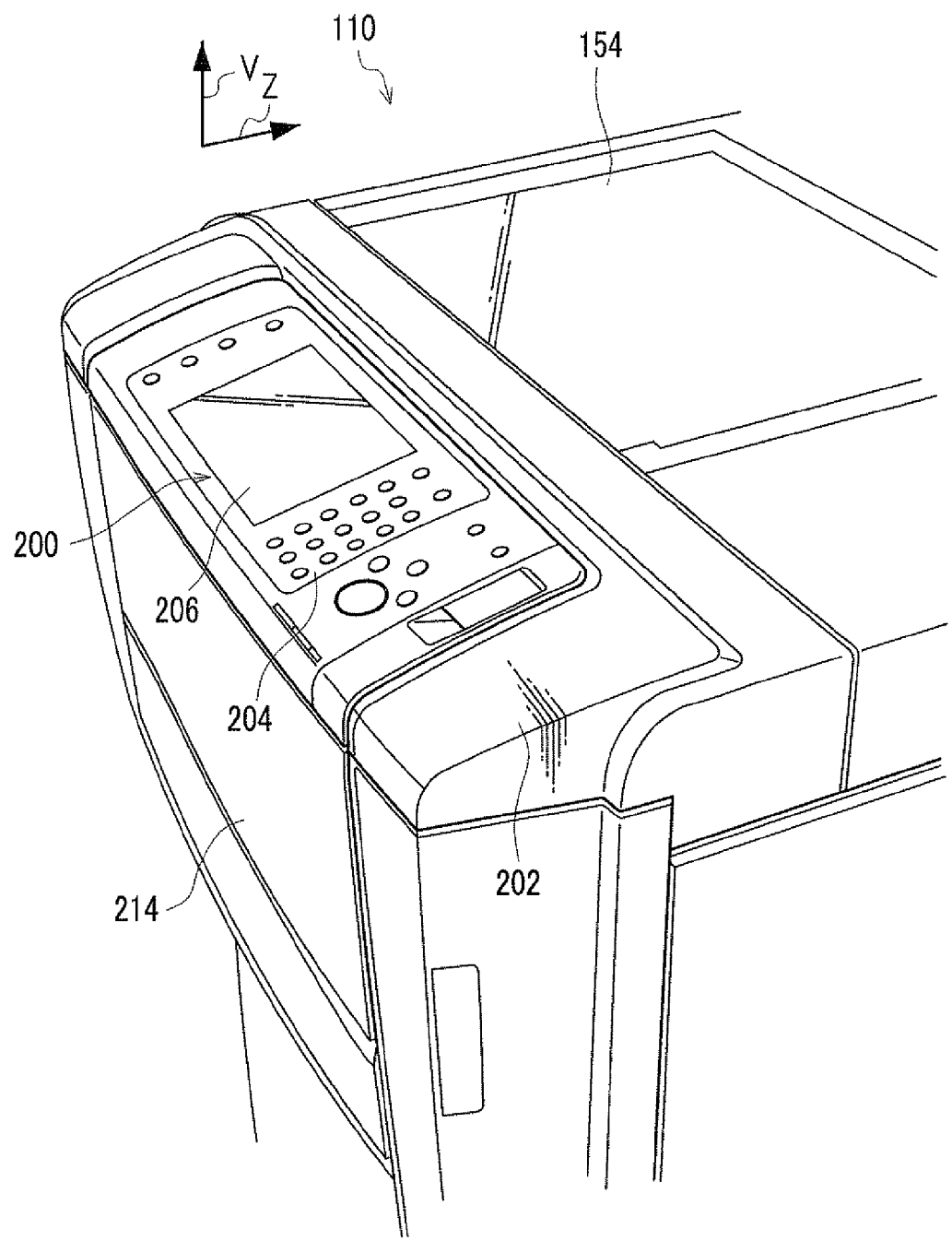
FIG. 7 is a perspective view of a transparent plate for a platen and an operation panel portion in the image forming apparatus related to the present exemplary embodiment.

As shown in FIG. 7, an operation panel as an example of an operating section operated by an operator is provided on the near side in the direction of an arrow Z, of the transparent plate 154 for a platen in the image forming apparatus 110.

The operation panel 200 includes an operation button portion 204 and a display panel 206, and the operation button portion 204 and the display panel 206 are exposed to the top face of a platen cover 202 as an example of a plate member attached to an upper portion of the apparatus body 110A. That is, the platen cover 202 forms the shell of the operation panel 200. Additionally, the operation button portion 204 is provided with plural operation buttons and ten keys from which various operation instructions such as copy operation are input, and the display panel 206 displays various messages, such as setting of operation conditions and an operation state. The operation panel 200 is arranged on the operation side by the operator with respect to the transparent plate 154 for a platen. In addition, the display panel 206 may be a touch panel in which setting is changed as the operator touches.

Image Forming Section

The image forming section 114 has an image forming unit 150 as an example of an image forming section that is provided below the document reader 116 to form an image using toner (developer). The image forming unit 150 includes a photoconductor 162, a charging member 164, an exposure device 166, a developing device 172, a transfer unit 170, and a cleaning device 173 that will be described below. Additionally, the transfer unit 170 includes an intermediate transfer belt 168, a primary transfer roll 167, an auxiliary roll 169, and a secondary transfer roll 171 that will be described below.

The cylindrical photoconductor 162 that is a latent image holding member is provided at the center of the apparatus body 110A in the image forming section 114. The photoconductor 162 rotates in the direction (the clockwise direction in the drawing) an arrow by a driving section (not shown), and carries an electrostatic latent image formed by light irradiation. Additionally, a corotron type charging member 164 that charges the surface of the photoconductor 162 is provided at a position that faces the outer peripheral surface of the photoconductor 162 above the photoconductor 162.

The exposure device 166 is provided at a position that faces the outer peripheral surface of the photoconductor 162 closer to the downstream side than the charging member 164 in the rotational direction of the photoconductor 162. The exposure device 166 has a semiconductor laser, an f-θ lens, a polygon mirror, an imaging lens, and plural mirrors that are not shown, and is adapted to perform scanning such that laser beam emitted from the semiconductor laser on the basis of an image signal is deflected by a polygon mirror, and to irradiate (expose) the outer peripheral surface of the photoconductor 162 charged by the charging member 164, to form an electrostatic latent image. In addition, the exposure device 166 may be of an LED (Light Emitting Diode) type without being limited to a type that performs scanning such that a laser beam is deflected by the polygon mirror.

A rotation switching type developing device 172 that develops an electrostatic latent image formed on the outer peripheral surface of the photoconductor 162 with a determined color toner to visualize the latent image is provided downstream of a portion that is irradiated with the exposure light of the exposure device 166 in the rotational direction of the photoconductor 162.

The developing device 172 is configured such that six developing components (reference numerals are omitted) respectively corresponding to individual toner colors of yellow (Y), magenta (M), cyan (C), black (K) a first special color (E), and a second special color (F) are arranged in parallel in a circumferential direction (in this order in the counterclockwise direction in the drawing). The individual developing components that perform development processing are switched as the developing components rotate by every 60° at a central angle by a motor (not shown), and face the outer peripheral surface of the photoconductor 162. In addition, when image formation of four colors of Y, M, C, and K is performed, since the first special color (E) and the second special color (F) are not used, the angle of rotation from a developing component corresponding to K to a developing component corresponding to Y becomes 180°.

The developing components are filled with developers (not shown) composed of a toner and a carrier that are supplied via toner supply passages (not shown) from toner cartridges 178Y, 178M, 178C, 178K, 178E, and 178F as an example of supply sections provided below the document reader 116.

Additionally, each developing component is provided with a developing roll 174 of which the outer peripheral surface faces the outer peripheral surface of the photoconductor 162. The developing roll 174 is constituted by a cylindrical developing sleeve provided so as to be able to rotate, and a magnetic member composed of plural magnetic poles fixed inside the developing sleeve. The developing device 172 forms a magnetic brush of a developer (carrier) as the developing sleeve rotates, and makes a toner according to a latent image (electrostatic latent image) formed on the outer peripheral surface of the photoconductor 162 adhere, to perform development. In addition, the toner cartridges 178E and 178F are filled with, for example, toners that are light-colored compared to Y, M, and C.

On the other hand, the transfer unit 170 is provided with an intermediate transfer belt 168 to which a toner image formed on the outer peripheral surface of a photoconductor 162 is transferred. The intermediate transfer belt 168 is an endless belt, and is arranged below the photoconductor 162 on the downstream side of the developing device 172 in the rotational direction of the photoconductor 162. Additionally, the intermediate transfer belt 168 is wound around a driving roll 161 that is rotationally driven by the control section 120, a tensioning roll 165 for imparting tension to the intermediate transfer belt 168, plural feed rolls 163 that contact with the back surface of the intermediate transfer belt 168 and rotate to follow the belt, and an auxiliary roll 169 that contacts with the back surface of the intermediate transfer belt 168 at a secondary transfer position to be described below, and rotates to follow the belt. The intermediate transfer belt 168 move circularly in the direction (the counterclockwise direction in the drawing) of an arrow –R as the driving roll 161 rotates.

Additionally, the primary transfer roll 167 that causes a toner image formed on the outer peripheral surface of the photoconductor 162 to be primarily transferred to the intermediate transfer belt 168 is provided opposite to the photoconductor 162 across the intermediate transfer belt 168. The primary transfer roll 167 contacts with the back surface of the intermediate transfer belt 168 at a position downstream in the movement direction of the intermediate transfer belt 168, away from a position (this is referred to as a primary transfer position) where the photoconductor 162 contacts with the intermediate transfer belt 168. The primary transfer roll 167 is applied voltage from a power source (not shown) to primarily transfer a toner image of the photoconductor 162 to the intermediate transfer belt 168 by a potential difference from the grounded photoconductor 162.

Moreover, the secondary transfer roll 171 that causes a toner image primarily transferred onto the intermediate transfer belt 168 to be secondarily transferred to a recording sheet P is provided opposite to the auxiliary roll 169 across the intermediate transfer belt 168, and a position between the secondary transfer roll 171 and the auxiliary roll 169 becomes a secondary transfer position where a toner image is transferred to a recording sheet P. The secondary transfer roll 171 contacts the front surface of the intermediate transfer belt 168 while being grounded, and secondarily transfers a toner image of the intermediate transfer belt 168 to a recording sheet P due to the potential difference between the auxiliary roll 169 and the secondary transfer roll 171 applied voltage from a power source (not shown).

Additionally, the cleaning blade 159 that collects the residual toner after the secondary transfer of the intermediate transfer belt 168 is provided opposite to the driving roll 161 across the intermediate transfer belt 168. The cleaning blade 159 is attached to a housing (not shown) formed with an opening portion, and the toner scraped by a tip part of the cleaning blade 159 is collected in the housing.

A position detection sensor 183 that detects a mark (not shown) given to the surface of the intermediate transfer belt 168 to detect a predetermined reference position on the intermediate transfer belt 168, and outputs a position detection signal that becomes a reference of the start timing of image formation processing is provided at the position that faces the feed roll 163 around the intermediate transfer belt 168. The position detection sensor 183 irradiates light toward the intermediate transfer belt 168 and receives the light reflected by the surface of the mark, to detect the movement position of the intermediate transfer belt 168.

On the other hand, the cleaning device 173 that cleans the residual toner remaining on the surface of the photoconductor 162 without being primarily transferred to the intermediate transfer belt 168 is provided on the downstream side of the primary transfer roll 167 in the rotational direction of the photoconductor 162. The cleaning device 173 has a configuration in which residual toner or the like is collected by the cleaning blade and a brush roll that contact with the surface of the photoconductor 162.

Additionally, a corotron 181 that performs neutralization of the toner remaining after primary transfer to the outer peripheral surface of a photoconductor 162 is provided on the upstream side (the downstream side of the primary transfer roll 167) of the cleaning device 173 in the rotational direction of the photoconductor 162. Moreover, an erasing device 175 that irradiates the outer peripheral surface of the photoconductor 162 after cleaning with light, to perform erasing is provided on the downstream side (the upstream side of the charging member 164) of the cleaning device 173 in the rotational direction of the photoconductor 162.

The secondary transfer position of a toner image by the secondary transfer roll 171 is set on the way of the aforementioned feeding path 128, and a fixing device 190 that fixes a toner image on a recording sheet P to which the toner image is transferred by the secondary transfer roll 171 is provided on the downstream side of the secondary transfer roll 171 in the transporting direction (the direction of the arrow A in the drawing) of the recording sheet P in the feeding path 128. The fixing device 190 has a fixing roll 192 that performs fixing by heating, and a pressure roll 194 that pressurizes a recording sheet P toward the fixing roll 192. In addition, a feed roll 139 that transports a recording sheet P toward the discharge section 115 or the reversal portion 133 is provided on the downstream side of the fixing device 190 in the transporting direction of the recording sheet P in the feeding path 128.

EXAMPLES

Although the invention will be described below in detail by means of examples, the invention is not limited only to the examples shown below. In addition, the "parts" and "%" shown below are mass bases as long as there is no particular mention.

Example 1

Preparation of Transparent Plate for Platen

An inner urethane resin layer and an outer urethane resin layer are formed by the following method on a glass substrate material (a float glass; the contact angle of water is 28 degrees, and the thickness is 1.8 mm) for a platen.

<Synthesis of Acrylic Resin Prepolymer A1>

A monomer solution composed of 286.8 parts of hydroxyethyl methacrylate (HEMA, the carbon number in a side chain hydroxyl group: 3) that is a monomer that becomes the short side chain hydroxyl group, 313.2 parts of butyl methacrylate (BMA), 27 parts of a polymerization initiator (benzoyl peroxide, 890), 60 parts of butyl acetate is put into a dropping funnel, and is dropped over 3 hours and polymerized in 300 parts of butyl acetate of which the temperature rises to 110° C. during stirring under nitrogen reflux. Moreover, a liquid composed of 135 parts of butyl acetate and 3 parts of BPO is dropped over 1 hour, and the reaction is completed. In addition, during the reaction, the stirring is continued while being held at 110° C. An acrylic resin prepolymer A1 that does not contain a long side chain hydroxyl group is synthesized in this way.

<Formation of Inner Urethane Resin Layer A1>

After the following liquid A is mixed with the following liquid B in the following ratio, the following liquid C is further added, and defoaming is performed under the reduced pressure for 10 minutes to obtain a coating liquid. This coating liquid is cast to the glass substrate material for a platen, and is cured at 85° C. for 1 hour and further at 130° C. for 30 minutes, to form the inner urethane resin layer A1 with a layer thickness of 30 μm.

Liquid A (the above acrylic resin prepolymer A1 liquid, 44.2%, hydroxyl value 206): 113 parts Liquid B (polyol made by Daicel Chemical Industries, Ltd., Placcel 208, and hydroxyl value 138 polycaprolactone diol [having a group with a carbon number of about 42]: 149.6 parts, and Liquid C (isocyanate made by Asahi Kasei Chemicals Co., Ltd., Duranate TKA100 compound name: polyisocyanurate of hexamethylene diisocyanate): 138.2 parts <Synthesis of Acrylic Resin Prepolymer A2>

An acrylic resin prepolymer A2 is synthesized by the method described in Synthesis of Acrylic Resin Prepolymer A1 except that, in the above <Synthesis of Acrylic Resin Prepolymer A1>, 228.8 parts of hydroxyethyl methacrylate (HEMA) and 207.7 parts of Placcel FM3 (made by Daicel Corporation, Compound name: lactone-modified methacrylate, and carbon number in side chain hydroxyl group: 21) are used instead of 286.8 parts of hydroxyethyl methacrylate (HEMA), and 950.4 parts of CHEMINOX FAMAC6 (made by Unimatec Co., Ltd., Compound name: 2-(perfluorohexyl) ethyl methacrylate, containing fluorine atoms) is used instead of 313.2 parts of butylmethacrylate (BMA).

<Formation of Outer Urethane Resin Layer A2>

Moreover, a coating liquid obtained by, in the above <Formation of Inner Urethane Resin Layer A1>, using the above acrylic resin prepolymer A2 liquid (44.0%, hydroxyl value 89): 113.6 parts instead of acrylic resin prepolymer A1 liquid: 113 parts, changing the amount of Liquid B (Placcel 208, hydroxyl value 138) to 64.6 parts, and changing the amount of Liquid C (Duranate TKA100) to 59.7 parts is used, the outer urethane resin layer A2 with a layer thickness of 30 μm is formed on the inner urethane resin layer A1 according to the conditions described in the <Formation of Inner Urethane Resin Layer A1>, and a transparent plate for a platen is obtained.

—Measurement of Return Rate—

First, in the method described in the above <Formation of Inner Urethane Resin Layer A1>, the coating liquid is not cast onto the glass substrate material for a platen, but is cast onto a polyimide film, to obtain an inner urethane resin layer sample A1 in which only the inner urethane resin layer A1 is formed on the polyimide film.

Moreover, in the method described in the above <Formation of Outer Urethane Resin Layer A2>, a coating liquid is not cast onto the inner urethane resin layer A1, but is cast onto a polyimide film, to obtain an outer urethane resin layer sample A2 in which that only the outer urethane resin layer A2 is formed on the polyimide film.

The return rate at room temperature (23° C.) of the inner and outer urethane resin layers by the aforementioned method, using the inner urethane resin layer sample A1 and the outer urethane resin layer sample A2 and using Fischerscope HM2000 (made by Fischer) as the measuring device. The return rate and the temperature that has self-repairability (that is, the return rate satisfies the aforementioned range) are shown in the following Table 1.

—Measurement of Refractive Index—

First, according to the conditions described in the above <Formation of Inner Urethane Resin Layer A1>, the coating liquid is not cast onto the glass substrate material for a platen, but is cast and cured onto a teflon (registered trademark) plate, and then the inner urethane resin layer A1 is peeled from the teflon (registered trademark) plate to obtain a single film (thickness of 90 μm) of the inner urethane resin layer A1.

Moreover, according to the conditions described in the above <Formation of Outer Urethane Resin Layer A2>, the coating liquid is not cast onto the inner urethane resin layer A1, but is cast and cured onto a teflon (registered trademark) plate, and then the outer urethane resin layer A2 is peeled from the teflon (registered trademark) plate to obtain a single film (thickness of 90 μm) of the outer urethane resin layer A2.

The refractive index of the inner and outer urethane resin layers is obtained by the aforementioned method, using the single film of the inner urethane resin layer A1 and the single film of the outer urethane resin layer A2. The refractive indexes of the obtained inner and outer urethane resin layers are shown in the following Table 1.

TABLE 1

| | Example 1 | |
|---|---|---|
| | Inner Urethane Resin Layer | Outer Urethane Resin Layer |
| Return Rate [%] (Room Temperature) | 96% | 95% |
| Self-repairing Temperature Region [° C.] | Room Temperature (23° C.) to 100° C. | Room Temperature (23° C.) to 90° C. |
| Refractive Index | 1.477 | 1.512 |

Comparative Example 1

Aspect in which Inner Urethane Resin Layer is not Provided

A transparent plate for a platen is formed by the method described in Example 1 except that, in Example 1, the inner urethane resin layer A1 is not formed, but the outer urethane resin layer A2 is directly formed on the glass substrate material for a platen.

[Evaluation]

Various evaluation tests are performed on the transparent plates for a platen of Example 1 and Comparative Example 1 by the following method. The results are shown in the following Table 2.

Evaluation of Repairing of Crack

A rubbing member obtained by making steel wool project in the shape of a circle from one end of a cylinder with a diameter of 3 cm is prepared, a steel wool portion of the rubbing member is brought into contact with the outer urethane resin layer of the transparent plate for a platen using a HEIDON friction tester, 20 g of load is applied at room temperature (23° C.), and scanning with a width of 3 cm is performed 100 times in a reciprocal manner at a speed of 10 mm/sec, thereby performing a rubbing test. Thereafter the number of cracks that may be confirmed by viewing the surface of the transparent plate for a platen is counted, and grade is evaluated as follows.

A: No defect

B: Defects are 1 or more and less than 10, and all the defects have disappeared after 24 hours C: Defects are 10 or more, or defects have not disappeared even after 24 hours Evaluation of Adhesiveness of Individual Layers After a cut end (cut crack) that reaches the glass substrate material for a platen is formed in a urethane resin layer, Cellotape (registered trademark) (made by Nichiban) is stuck on the surface of the urethane resin layer so as to straddle the cut end (so as to orthogonally intersect the direction of a cut line of the cut end as seen from the surface), the Cellotape (registered trademark) (made by Nichiban) is peeled from one side (peeled in a direction orthogonal to the direction of the cut line), and the following grade evaluation is performed.

A: Urethane resin layer is not peeled from glass substrate material

C: Urethane resin layer is peeled from glass substrate material.

—Evaluation of Antireflection Property (Measurement of Reflectivity)—

The reflectivity when the transparent plate for a platen is irradiating with light with a wavelength of 550 nm is measured using U4100 spectrophotometer made by HITACHI.

TABLE 2

| | Example 1 | Comparative Example 1 |
|---|---|---|
| Crack Restorability | A | B |
| Adhesiveness | A | C |
| Reflectivity | 2% | 15% |

Example 2

Preparation of Fixing Roll

An inner urethane resin layer and an outer urethane resin layer are formed by the following method on an aluminum core tube (the contact angle of water is 65 degrees) for a fixing roll.

<Synthesis of Acrylic Resin Prepolymer B1>

An acrylic resin prepolymer B1 is synthesized by the method described in Synthesis of Acrylic Resin Prepolymer A1 except that, in the above <Synthesis of Acrylic Resin Prepolymer A1>, the ratio (molar ratio) of hydroxyethyl methacrylate (HEMA) and butylmethacrylate (BMA) is changed to 5:1.

<Formation of Inner Urethane Resin Layer B1>

Duranate TPA-B80E (isocyanate made by Asahi Kasei Chemicals Co., Ltd.) equivalent to an amount of isocyanate equal to a hydroxyl group of an acrylic resin prepolymer is blended with the acrylic resin prepolymer B1 to obtain a coating liquid. This coating liquid is coated on the aluminum core tube for a fixing roll by flow coating, and is cured at 80°

C. for 1 hour and further at 180° C. for 1 hour, to form an inner urethane resin layer B1 with a layer thickness of 30 μm.

<Synthesis of Acrylic Resin Prepolymer B2>

An acrylic resin prepolymer B2 is synthesized by the method described in Synthesis of Acrylic Resin Prepolymer B1 except that, in the above <Synthesis of Acrylic Resin Prepolymer B1>, CHEMINOX FAMAC6 (made by Unimatec Co., Ltd., Compound name: 2-(perfluorohexyl)ethyl methacrylate, containing fluorine atoms) is used instead of butylmethacrylate (BMA).

<Formation of Outer Urethane Resin Layer B2>

Moreover, in the above <Formation of Inner Urethane Resin Layer B1>, the coating liquid obtained by using the above acrylic resin prepolymer B2 instead of the acrylic resin prepolymer B1 is used, the outer urethane resin layer B2 with a layer thickness of 30 μm is formed on the inner urethane resin layer B1 according to the conditions described in <Formation of Inner Urethane Resin Layer B1>, and a fixing roll is obtained.

Comparative Example 2

Aspect in which Inner Urethane Resin Layer is not Provided

An aluminum core tube (the contact angle of water is 112 degrees) having PEA coated on the surface thereof is used instead of the aluminum core tube for a fixing roll (the contact angle of water is 65 degrees) used in Example 2, and the coating liquid for forming the inner urethane resin layer B1 described in Example 2 is applied, but is repelled on the surface and is not uniformly applied.

Example 3

Preparation of Fixing Belt

An inner urethane resin layer and an outer urethane resin layer are formed by the following method on a substrate material (the contact angle of water is 88 degrees) for a fixing belt in which 3 mm of silicone rubber is applied to a polyimide film with a thickness of 100 μm.

<Synthesis of Acrylic Resin Prepolymer C1>

An acrylic resin prepolymer C1 is synthesized by the method described in Synthesis of Acrylic Resin Prepolymer B1 except that, in the above <Synthesis of Acrylic Resin Prepolymer B1>, hydroxyethyl methacrylate (HEMA), butylmethacrylate (BMA), and Silaplane FM0711 (silicone side chain, Chisso Corp.) are used in a ratio (molar ratio) of 4:1:1 instead of using hydroxyethyl methacrylate (HEMA) and butylmethacrylate (BMA) in a ratio (molar ratio) of 5:1.

<Formation of Inner Urethane Resin Layer C1>

Duranate TPA-B80E (isocyanate made by Asahi Kasei Chemicals Co., Ltd.) equivalent to an amount of isocyanate equal to a hydroxyl group of an acrylic resin prepolymer is blended with the acrylic resin prepolymer C1 to obtain a coating liquid. This coating liquid is coated on the substrate material for a fixing belt by flow coating, and is cured at 80° C. for 1 hour and further at 180° C. for 1 hour, to form the inner urethane resin layer C1 with a layer thickness of 30 μm.

<Synthesis of Acrylic Resin Prepolymer C2>

An acrylic resin prepolymer C2 is synthesized by the method described in Synthesis of Acrylic Resin Prepolymer C1 except that, in the above <Synthesis of Acrylic Resin Prepolymer C1>, CHEMINOX FAMAC6 (made by Unimatec Co., Ltd., Compound name: 2-(perfluorohexyl)ethyl methacrylate, containing fluorine atoms) is used instead of butylmethacrylate (BMA).

<Formation of Outer Urethane Resin Layer C2>

Moreover, in the above <Formation of Inner Urethane Resin Layer C1>, the coating liquid obtained by using the above acrylic resin prepolymer C2 instead of the acrylic resin prepolymer C1 is used, the outer urethane resin layer C2 with a layer thickness of 30 μm is formed on the inner urethane resin layer C1 according to the conditions described in <Formation of Inner Urethane Resin Layer C1>, and a fixing belt is obtained.

TABLE 3

|  | Example 2 | | Example 3 | |
| --- | --- | --- | --- | --- |
|  | Inner Urethane Resin Layer | Outer Urethane Resin Layer | Inner Urethane Resin Layer | Outer Urethane Resin Layer |
| Return Rate [%] | 91% | 92% | 94% | 94% |
| Self-repairing Temperature Region [° C.] | 100° to 250° C. | 100° to 270° C. | 100° to 270° C. | 100° to 280° C. |

[Evaluation]

Evaluation tests of adhesiveness are performed on the fixing roll of Example 2 and the fixing belt of Example 3 by the following method. The results are shown in the following Table 4.

Evaluation of Adhesiveness of Individual Layers

The fixing roll of Example 2 and the fixing belt of Example 3 are mounted on an electrophotographic image forming apparatus, respectively, and 5000 sheets of images are output. Then, a cut end (cut crack) that reaches the substrate material (the aluminum core tube for a fixing roll or substrate material for a fixing belt) is formed in a urethane resin layer. Thereafter, Cellotape (registered trademark) (made by Nichiban) is stuck on the surface of the urethane resin layer so as to straddle the cut end (so as to orthogonally intersect the direction of a cut line of the cut end as seen from the surface), the Cellotape (registered trademark) (made by Nichiban) is peeled from one side (peeled in a direction orthogonal to the direction of the cut line), and the following grade evaluation is performed.

A: Urethane resin layer is not peeled from substrate material

C: Urethane resin layer is peeled from substrate material.

TABLE 4

|  | Example 2 | Example 3 |
| --- | --- | --- |
| Adhesiveness | A | C |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A urethane resin laminate comprising:
   a substrate material having a contact angle of water of the surface of the substrate material being from 0 degrees to 90 degrees, an inner urethane resin layer, and an outer urethane resin layer in this order,
   wherein the inner urethane resin layer contains urethane resin that does not have a fluorine atom in a molecular structure, and has self-repairability, and
   the outer urethane resin layer contains urethane resin contains a fluorine atom in a molecular structure, and has self-repairability.

2. The urethane resin laminate according to claim 1, wherein a temperature region of the self-repairability in the outer urethane resin layer and a temperature region of the self-repairability in the inner urethane resin layer overlap each other.

3. The urethane resin laminate according to claim 1,
   wherein all the outer urethane resin layer, the inner urethane resin layer, and the substrate material have transparency, and
   wherein the refractive indexes of the outer urethane resin layer and the inner urethane resin layer are different from each other, and the layer thickness of the outer urethane resin layer is a layer thickness at which the phase of reflected light (L2) reflected by an interface between the outer urethane resin layer and the inner urethane resin layer is reversed with respect to the phase of reflected light (L1) provided such that the light incident from outer urethane resin layer side is reflected by an outer surface of the outer urethane resin layer.

4. The urethane resin laminate according to claim 2,
   wherein all the outer urethane resin layer, the inner urethane resin layer, and the substrate material have transparency, and
   wherein the refractive indexes of the outer urethane resin layer and the inner urethane resin layer are different from each other, and the layer thickness of the outer urethane resin layer is a layer thickness at which the phase of reflected light (L2) reflected by an interface between the outer urethane resin layer and the inner urethane resin layer is reversed with respect to the phase of reflected light (L1) provided such that the light incident from outer urethane resin layer side is reflected by an outer surface of the outer urethane resin layer.

5. The urethane resin laminate according to claim 1,
   wherein the contact angle of water of the surface of the substrate material is from 10 degrees to 60 degrees.

6. The urethane resin laminate according to claim 1,
   wherein the urethane resin of the inner urethane resin layer is formed from an acrylic resin having a hydroxyl group.

7. The urethane resin laminate according to claim 1,
   wherein the urethane resin of the outer urethane resin layer is formed from an acrylic resin having a fluorine atom.

8. The urethane resin laminate according to claim 7,
   wherein the acrylic resin is an acrylic resin having a hydroxyl group.

9. The urethane resin laminate according to claim 8,
   wherein the acrylic resin is a copolymer of an acrylic monomer having a hydroxyl group and an acrylic monomer having a fluorine atom.

10. A fixing roll for an image forming apparatus comprising:
    thane resin laminate according to claim 1 having the substrate material, the inner urethane resin layer, and the outer urethane resin layer, wherein the substrate material is cylindrical.

11. A fixing belt for an image forming apparatus comprising:
    the urethane resin laminate according to claim 1 having the substrate material, the inner urethane resin layer, and the outer urethane resin layer, wherein the substrate material is belt-shaped.

12. An image fixing device comprising:
    a first rotating member; and
    a second rotating member that contacts with the first rotating member to form a nip region where a recording medium is nipped,
    wherein at least one of the first rotating member and the second rotating member is the fixing roll according to claim 10.

13. An image fixing device comprising:
    a first rotating member; and
    a second rotating member that contacts with the first rotating member to form a nip region where a recording medium is nipped,
    wherein at least one of the first rotating member and the second rotating member is the fixing belt according to claim 11.

14. An image forming apparatus comprising:
    an electrostatic latent image holding member;
    an electrostatic latent image forming device that forms an electrostatic latent image on the surface of the electrostatic latent image holding member;
    a developing device that develops the electrostatic latent image with a toner to form a toner image;
    a transfer device that transfers the toner image to a recording medium; and
    an image fixing device that fixes the toner image on the recording medium,
    wherein the image fixing device is the image fixing device according to claim 12.

15. An image forming apparatus comprising:
    an electrostatic latent image holding member;
    an electrostatic latent image forming device that forms an electrostatic latent image on the surface of the electrostatic latent image holding member;
    a developing device that develops the electrostatic latent image with a toner to form a toner image;
    a transfer device that transfers the toner image to a recording medium; and
    an image fixing device that fixes the toner image on the recording medium,
    wherein the image fixing device is the image fixing device according to claim 13.

16. A transparent plate for a platen for a document reader comprising:
    the plate that is the urethane resin laminate according to claim 1 having the substrate material, the inner urethane resin layer, and the outer urethane resin layer,
    wherein all the outer urethane resin layer, the inner urethane resin layer, and the substrate material have transparency.

17. A document reader comprising:
    the transparent plate for a platen according to claim 16; and
    a document reading section that reads a document on the surface of the transparent plate on the outer urethane resin layer side from the side opposite to the transparent plate.

18. An image forming apparatus comprising:
the document reader according to claim 17; and
an image forming section that forms an image on a recording medium on the basis of image information read by the document reader.

\* \* \* \* \*